United States Patent
Tanaka

(10) Patent No.: US 6,967,686 B1
(45) Date of Patent: Nov. 22, 2005

(54) IMAGE SENSING METHOD, IMAGE SENSING APPARATUS, LENS CONTROL METHOD THEREFOR, AND STORAGE MEDIUM

(75) Inventor: Taeko Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/256,411

(22) Filed: Feb. 24, 1999

(30) Foreign Application Priority Data

Feb. 27, 1998 (JP) .................................. 10-061970
Mar. 20, 1998 (JP) .................................. 10-071545

(51) Int. Cl.⁷ ....................... H04N 5/232; H04N 5/228; G03B 13/00
(52) U.S. Cl. ....................... 348/352; 348/354; 348/349; 348/208.12; 348/347; 348/356
(58) Field of Search ............................... 348/352, 354, 348/349, 208.12, 347, 356, 357

(56) References Cited

U.S. PATENT DOCUMENTS

| | | | | |
|---|---|---|---|---|
| 5,164,835 A | * | 11/1992 | Yamada et al. | 348/352 |
| 5,331,367 A | * | 7/1994 | Kawasaki et al. | 396/77 |
| 5,517,238 A | * | 5/1996 | Hirasawa | 348/208.12 |
| 5,587,737 A | * | 12/1996 | Sekine et al. | 348/208.8 |
| 5,619,264 A | * | 4/1997 | Yoshimura et al. | 348/352 |
| 5,699,116 A | * | 12/1997 | Yamazaki et al. | 348/354 |
| 5,842,059 A | * | 11/1998 | Suda | 396/101 |
| 6,373,524 B2 | * | 4/2002 | Suda et al. | 348/345 |
| 2002/0109784 A1 | * | 8/2002 | Suda et al. | 348/345 |

* cited by examiner

Primary Examiner—Thai Tran
Assistant Examiner—James M. Hannett
(74) Attorney, Agent, or Firm—Morgan & Finnegan, LLP

(57) ABSTRACT

It is an object of this invention to provide an image sensing method which allows object focus tracking during zooming regardless of the shutter speed. In order to achieve this object, a zoom motor for driving a zoom lens is controlled by a lens control microcomputer to decrease the zoom speed.

15 Claims, 20 Drawing Sheets

| v \ n | 0 | 1 | 2 | 3 | ... | k | ... | m |
|---|---|---|---|---|---|---|---|---|
| 0 | A00 | A10 | A20 | A30 | ... | Ak0 | ... | Am0 |
| 1 | A01 | A11 | A21 | A31 | ... | Ak1 | ... | Am1 |
| 2 | A02 | A12 | A22 | A32 | ... | Ak2 | ... | Am2 |
| 3 | A03 | A13 | A23 | A33 | ... | Ak3 | ... | Am3 |
| : | : | : | : | : |  | : |  | : |
| k | A0k | A1k | A2k | A3k | ... | Akk | ... | Amk |
| : | : | : | : | : |  | : |  | : |
| s | A0s | A1s | A2s | A3s | ... | Aks | ... | Ams |

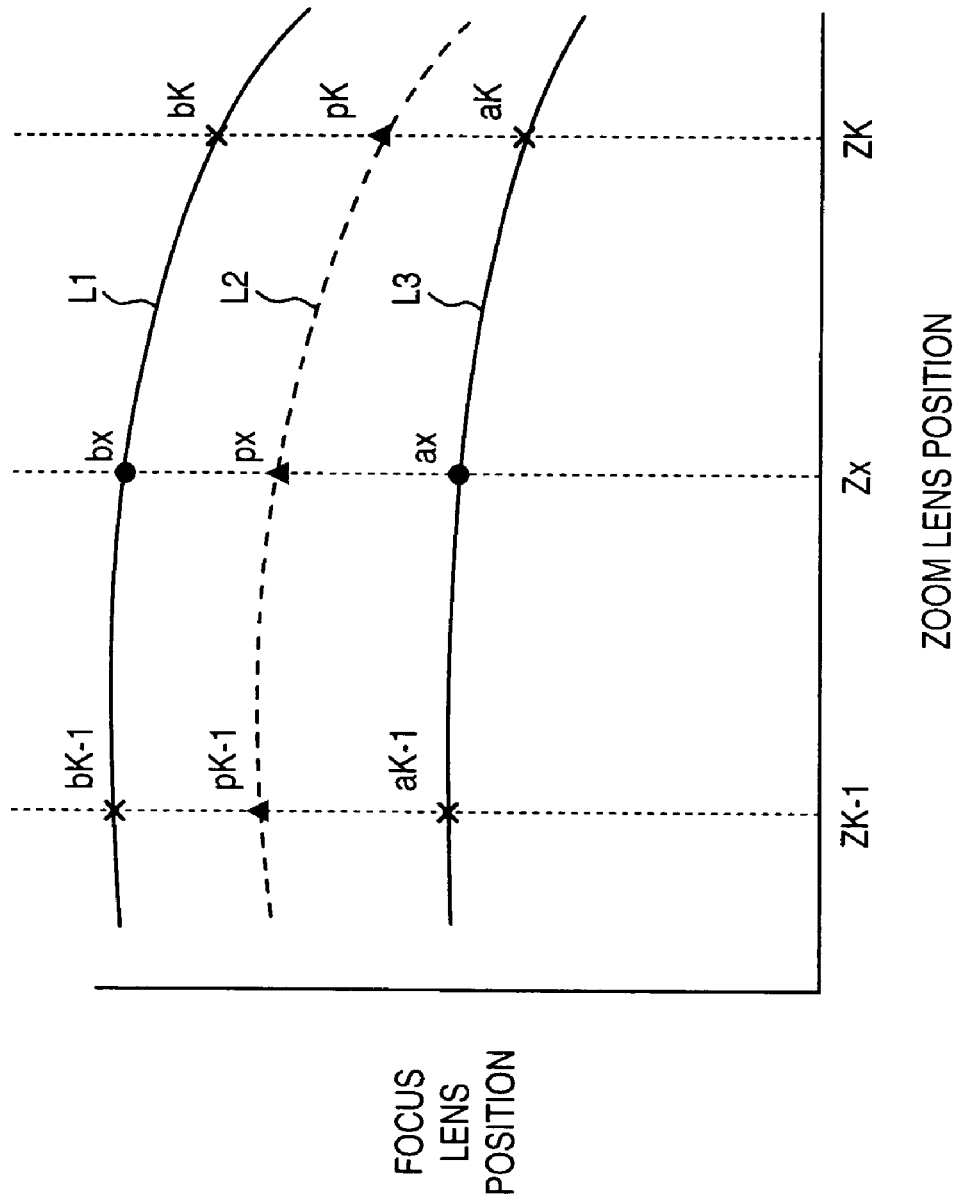

SHUTTER SPEED : 1/60

SHUTTER SPEED : 1/30

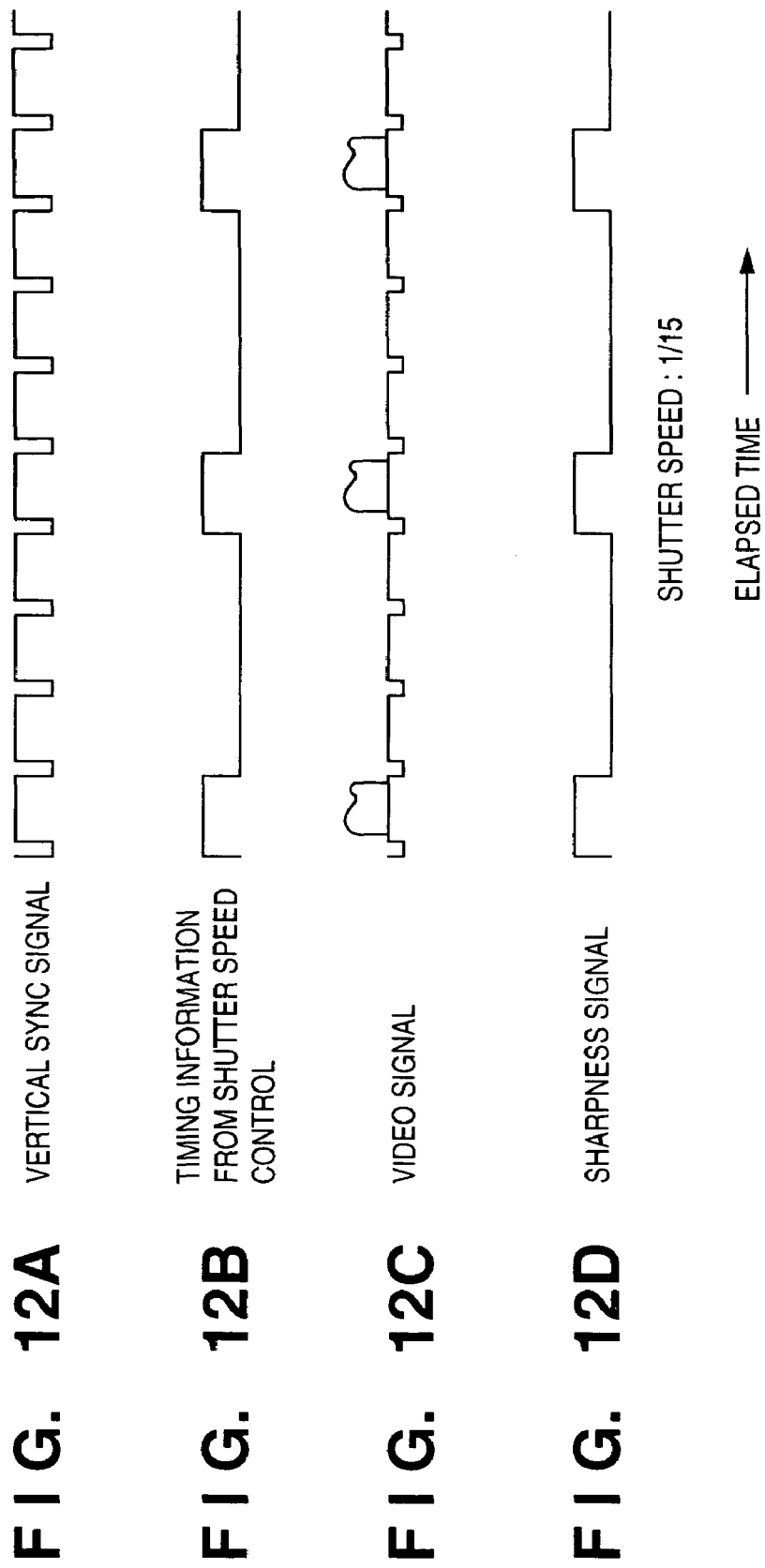

IMAGE SENSING METHOD, IMAGE SENSING APPARATUS, LENS CONTROL METHOD THEREFOR, AND STORAGE MEDIUM

BACKGROUND OF THE INVENTION

The present invention relates to an image sensing method, an image sensing apparatus, a lens control method therefor, and a storage medium storing a control program for controlling the image sensing apparatus.

FIG. 5 shows the schematic arrangement of an inner focus type lens system in a conventional image sensing apparatus. Referring to FIG. 5, reference numeral 501 denotes a first stationary lens; 502, a zoom lens for zooming; 503, a stop for light amount adjustment; 504, a second stationary lens; 505, a focus lens (focus compensation lens) having both a focus adjustment function and a so-called compensation function of correcting the movement of a focal plane upon zooming; and 506, the imaging plane of an image sensing element such as a CCD.

In the lens system having the arrangement shown in FIG. 5, since the focus compensation lens 505 has both the compensation function and the focus adjustment function, the position of the focus compensation lens 505 to be focused on the imaging plane 506 varies depending on the object distance even if the focal length remains the same.

FIG. 6 shows the result obtained by changing the object distance at each focal length, and continuously plotting the position of the focus compensation lens 505 to be focused on the imaging plane 506. Referring to FIG. 6, the ordinate indicates the position of the focus compensation lens 505; and abscissa, the focal length (the position of the zoom lens).

If one of the loci in FIG. 6 is selected in accordance with the object distance, and the focus compensation lens 505 is moved along the selected locus during zooming, zooming can be done without any blur.

A front-element focus type lens system has a compensation lens independently of a zoom lens. The zoom lens and the compensation lens are coupled to each other through a mechanical cam ring. Assume that this cam ring has a knob for manual zooming, and the focal length is to be changed manually. In this case, the cam ring rotates following the movement of the knob, and the zoom lens and the compensation lens move along the cam groove of the cam ring. As long as the focus lens stays focused, no blur is caused by the above operation.

In general, in control operation in the inner focus type lens system having the above characteristics, a plurality of pieces of locus information shown in FIG. 6 are stored in advance, in some form, in the lens control microcomputer, and a locus (cam locus) is selected on the basis of the positions of the focus lens and the zoom lens, thereby zooming along the selected locus.

To read out the position of the focus lens relative to the position of the zoom lens from the storage element and use it in lens control, the position of each lens must be read accurately to some degree. As is obvious from FIG. 6 as well, when the zoom lens moves at a constant speed or nearly constant speed, in particular, the slope of the locus of the focus lens changes from moment to moment with changes in focal length. This indicates that the moving speed and the slope of movement of the focus lens change from moment to moment. In other words, an actuator for the focus lens needs to have speed response characteristics with a high precision of 1 Hz to several hundred Hz.

As an actuator, i.e., a focus lens driving motor, in an inner focus type lens system, which satisfies the above requirement, a stepping motor is generally used. The stepping motor rotates in perfect synchronization with step pulses output from the lens control microcomputer or the like. Since the step angle of the motor per pulse is constant, high speed response characteristics, high stop precision, and high position precision can be obtained.

When a stepping motor is to be used, since the rotational angle is constant with respect to the number of step pulses, these pulses can be used as an incremental encoder. Hence, no special position encoder is required.

As described above, when zooming is to be performed by using a stepping motor while the object is kept in focus, the locus information in FIG. 6 must be stored in advance, in some form (loci themselves or a function using the lens position as a variable), in the lens control microcomputer or the like, and the focus lens must be moved on the basis of the locus information read out in accordance with the position or moving speed of the zoom lens.

FIGS. 7 and 8 are views for explaining an example of conventional locus tracking methods.

FIG. 7 shows the in-focus locus of the focus lens, accompanying the movement of the zoom lens, for each object distance. Each locus is specified by the zoom lens position, i.e., the focal length, and the focus lens position, i.e., the object distance. The object can be maintained in focus during zooming by driving the focus lens along the locus.

FIG. 8 shows how the cam locus information in FIG. 7 is stored in the lens control microcomputer (or external memory). Referring to FIG. 8, a variable v indicates the focus lens position (zone) in the object distance direction, and a variable n indicates the zoom lens position (zone) in the focal length direction. Data $A(n, v)$ representing the focus lens position is specified by these pieces of information.

Referring to FIG. 7, the ordinates indicates the focus lens position; and the abscissa, the zoom lens position ($z0$, $z1$, $z2$, ..., $z6$). In addition, L1($a0$, $a1$, $a2$, ..., $a6$) and L3($b0$, $b1$, $b2$, ... $b6$) are respectively the representative loci stored in the lens control microcomputer. L2($p0$, $p1$, $p2$, ..., $p6$) is the locus calculated on the basis of the above two loci L1 and L3 by $$p(n+1)=|p(n)-a(n)|/|b(n)-a(n)|\times|b(n+1)-a(n+1)|+a(n+1) \quad (1)$$

According to equation (1), in the case shown in FIGS. 7 and 8, when the focus lens is located at $p0$, the ratio at which $p0$ internally divides a line segment $b0$–$a0$ is obtained, and a point that internally divides a line segment $b1$–$a1$ at the obtained ratio is defined as $p1$. The moving speed of the focus lens at which an in-focus state is maintained can be obtained from the difference in position between the points $p1$ and $p0$ and the time required for the zoom lens to move from $z0$ to $z1$.

Consider a case in which the zoom lens need not stop on only boundaries having the stored representative locus data.

FIG. 9 is a graph for explaining interpolation in the zoom lens position direction. This graph shows a portion of FIG. 7 with arbitrary zoom lens positions.

Referring to FIG. 9, the ordinate indicates the focus lens position, and the abscissa, the zoom lens position ($Zk-1$, $Zx$, $Zk$). In addition, L1($bk-1$, $bx$, $bk$), L2($pk-1$, $px$, $pk$), and L3($ak-1$, $ax$, $ak$) indicate the representative loci (focus lens positions relative to zoom lens positions) stored in the lens control microcomputer. When the zoom lens positions are Z0, z1, ..., Zk−1, zk, ..., Zn, the corresponding focus lens positions for the respective object distances are:

a0, a1, ...., ak−1, ak, ..., an
b0, b1, ..., bk−1, bk, ..., bn

When the current zoom lens position is the position Zx, which is not on a zoom boundary, and the current focus lens position is the position px, ax and bx are given by:

$$ax = ak − (Zk − Zx) \times (ak − ak−1)/(Zk − Zk−1) \quad (2)$$

$$bx = bk − (Zk − Zx) \times (bk − bk−1)/(Zk − Zk−1) \quad (3)$$

That is, ax and bx can be obtained by internally dividing data of the four stored representative locus data (ak, ak−1, bk, and bk−1 in FIG. 9), which are obtained at the same object distance, at the internal ratio obtained from the current zoom lens position and two zoom boundary positions (e.g., Zk and Zk−1 in FIG. 9) on the two sides of the current zoom lens position. Then, pk and pk−1 can be obtained by internally dividing data of the four stored representative data (ak, ak−1, bk, and bk−1 in FIG. 9), which are obtained at the same focal length, at the internal ratio obtained from ax, px, and bx, as per equation (1). When zooming is to be performed from the wide-angle side to the telephoto side, the moving speed of the focus lens at which an in-focus state is maintained can be obtained from the difference in position between the destination focus position pk and the current focus position px and the time required for the zoom lens to move from Zx to Zk. When zooming is to be performed from the telephoto side to the wide-angle side, the moving speed of the focus lens at which an in-focus state is maintained can be obtained from the difference in position between the target focus position pk−1 and the current focus position px and the time required for the zoom lens to move from Zx to Zk−1.

The above locus tracking method has been proposed.

Again, as is apparent from FIG. 6, in particular, when the zoom lens moves from the telephoto side to the wide-angle side, the object can be maintained in focus by the above locus tracking method. When, however, the zoom lens moves from the wide-angle side to the telephoto side, since a specific locus which the focus lens at a convergence point should track is not known, an in-focus state cannot be maintained by the same locus tracking method.

FIGS. 10A and 10B are graphs for explaining an example of locus tracking which has been proposed to solve the above problem. Referring to FIG. 10A, the ordinate indicates the high-frequency component (sharpness signal) of a luminance signal, i.e., an AF evaluation signal, in the vertical sync period, and the abscissa, the position of the zoom lens. Referring to FIG. 10B, the ordinate indicates the position of the focus lens; and the abscissa, the position of the zoom lens.

Referring to FIG. 10A, reference numeral 1001 denotes the maximum value of the level of the sharpness signal; 1002, the minimum value (TH1) of the level of the sharpness signal; and 1003, the level of the sharpness.

Referring to FIG. 10B, reference numerals 1004 and 1005 denote cam loci; and 1006, the zoom lens position.

Assume that the cam locus 1004 in FIG. 10B is a focus cam locus in zooming for a given object. Assume that the focus cam locus tracking speeds on the wide-angle side relative to the zoom lens position 1006 (Z14) are positive (in the direction of the closest focusing distance of the focus lens), and the in-focus cam tracking speeds on the telephoto side relative to the zoom lens position 1006 (Z14) on which the lens moves toward infinity are negative. Admittedly, when the focus lens moves along the focus cam locus 1004 while it stays focused, the level of the above sharpness signal becomes almost constant.

The moving speed of the focus lens that traces the focus cam locus 1004 in FIG. 10B in zooming is represented by Vf0, and the actual moving speed of the focus lens is represented by Vf. When zooming is performed while the moving speed Vf of the focus lens is changed with respect to the moving speed Vf0 of the focus lens that traces the focus cam locus 1004, the resultant cam locus becomes the zigzag cam locus 1005. At this time, the level of the sharpness signal changes to produce valleys and crests, as indicated by "1003" in FIG. 10A. At each point of intersection of the cam loci 1004 and 1005, the level 1003 of the sharpness signal becomes maximum (even points of Z0, z1, ..., Z16). At each odd point of Z0, Z1, ..., Z16, at which the moving direction vector of the cam locus 1005 is switched, the level 1003 of the sharpness signal becomes minimum.

Referring to FIG. 10A, although reference numeral 1002 denotes the minimum value (TH1) of the level 1003 of the sharpness signal, a minimum value (TH1) 1002 may be set for the level 1003 of the sharpness signal, and the moving direction vector of the cam locus 1005 in FIG. 10B may be switched every time the level 1003 of the sharpness signal becomes the minimum value (TH1) 1002. With this operation, the moving direction of the focus lens upon switching can be set in a direction in which the lens approaches the focus cam locus 1004 in FIG. 10B.

That is, zooming with less blur amount can be performed by controlling the moving direction and speed of the focus lens to reduce blur every time an image blurs by the difference between the maximum level 1001 and minimum level (TH1) 1002 of the sharpness signal.

With the use of the above method, in zooming from the wide-angle side to the telephoto side, in which the cam loci in FIG. 6 diverge from a convergence point, a locus along which the level 1003 of the sharpness signal does not become lower than the minimum value (TH1) 1002 in FIG. 10A, i.e., blur does not occur beyond a predetermined amount, can be selected by repeating switching operation (in accordance with changes in the level of the sharpness signal), like the cam locus 1005 in FIG. 10B, while controlling the moving speed Vf of the focus lens with respect to the tracking speed described in the prior art (calculated by using p(n+1) obtained from equation (1)) even if the focusing speed Vf0 is unknown.

In this case, the moving speed Vf of the focus lens is given by:

$$Vf = Vf0 + Vf+ \quad (4)$$

$$Vf = Vf0 + Vf− \quad (5)$$

where Vf+ is the correction speed in the positive direction, and Vf− is the correction speed in the negative direction.

In this case, to prevent offsets in locus tracking operation by the above zooming method, the correction speeds Vf+ and Vf− are determined such that the internal angle the two direction vectors of the moving speed Vf of the focus lens, which are obtained from equations (4) and (5), make with each other is equally divided into two by the direction vector of the moving speed Vf0 of the focus lens that traces the focus cam locus 1004. In addition, a technique of improving locus selection precision by changing the magnitudes of the correction speeds in accordance with focal length and depth of field has also been proposed. In addition, a method of tracking a locus by using an integral signal that sensitively changes with blur in place of a sharpness signal has been proposed.

In the prior art described above, the sharpness signal is the high-frequency component of a video signal. At a shutter speed of 1/60 sec in the general NTSC scheme, a video signal can be obtained in each vertical sync period, as shown in FIG. 11A. When, however, the shutter speed decreases, and the charge storage time of the image sensing element 506 is prolonged, for example, when a shutter speed of 1/30 sec is set as shown in FIG. 11B, a signal stored in the image sensing element 506 for 1/30 sec becomes a video signal. Therefore, a video signal is detected once per every 1/30 sec, i.e., once per every two vertical sync periods. That is, no video signal is detected once per every two vertical sync periods. At a shutter speed of 1/15 sec, a video signal is detected only once per every four vertical sync periods.

FIGS. 12A to 12D show the relationship between the sharpness signal and the elapsed time at a shutter speed of 1/15 sec in an in-focus state in which the positions of an object and the focus lens remain the same. FIG. 12A shows a vertical sync signal; FIG. 12B, timing information from shutter speed control; FIG. 12C, a video signal; and FIG. 12D, a sharpness signal.

As can be seen from FIGS. 12A to 12D, the level of the sharpness signal changes even as the lens stays focused. According to the method of controlling the moving direction and speed of the focus lens to reduce blur every time an image blurs by the difference between the maximum value 1001 and minimum value (TH1) 1002 of the level 1003 of the sharpness signal in FIGS. 10A and 10B as in zooming operation, zooming operation following the object is realized in accordance with the difference information between the maximum value 1001 and minimum value (TH1) 1002 of the sharpness signal level 1003. When the shutter speed is low, e.g., 1/15 sec, information of the minimum value (TH1) 1002, from which a sharpness signal is obtained, is obtained once per every four vertical sync periods. That is, the period at which the direction is changed following the object is prolonged. As a result, the object cannot be tracked during zooming.

In addition, multiple speed zooming has recently become popular, and hence the zoom speeds vary from low-speed zooming to high-speed zooming. In this case as well, the focal plane must track an object to be photographed during zooming.

Since the sharpness integral signal of an AF evaluation signal is a value obtained by adding sharpness peak signals in a horizontal sync period together within a vertical sync period, changes in evaluation signal are also integrated and appear owing to noise caused by camera shakes or the like during low-speed zooming. For this reason, whether a given change is a change in evaluation signal due to a focus lens tracking error during zooming or a change due to noise or the like cannot be determined. As a result, the focal plane cannot accurately track the object during zooming.

Furthermore, in high-speed zooming, since the view angle changes steeply, whether a given change is a change in evaluation signal due to a focus lens tracking error during zooming or a change in view angle cannot be determined. As a result, the focal plane cannot accurately track the object during zooming.

SUMMARY OF THE INVENTION

The present invention has been made in consideration of the problems in the prior art described above, and has as its object to provide an image sensing method and apparatus which can select a focus cam locus and perform focus tracking without blur in zooming from the wide-angle side on which no focus cam locus is determined to the telephoto side in slow shutter operation.

It is another object of the present invention to provide a storage medium which stores a control program capable of smoothly controlling an image sensing apparatus of the present invention.

It is still another object of the present invention to allow a camera or the like which uses multiple speed zooming from low-speed zooming to high-speed zooming to make the focal plane accurately track an object to be photographed during zooming operation regardless of zoom the speeds.

It is still another object of the present invention to make the focal plane accurately track an object to be photographed during zooming operation in accordance with the presence/absence of internal noise such as noise resulting from camera shakes which are likely to occur during low-speed zooming or another factor.

In order to solve the above problems and achieve the above objects, an image sensing method according to its first aspect of the present invention is characterized by the following arrangement.

The method comprises the zooming step of performing zooming operation, the shutter speed control step of controlling a timing of a charge storage time of an image sensing element, and the control step of controlling to change a zoom speed in the zooming step in accordance with a shutter speed.

An image sensing apparatus according to its first aspect of the present invention is characterized by the following arrangement.

The apparatus comprises zooming means for performing zooming operation, shutter speed control means for controlling a timing of a charge storage time of an image sensing element, and control means for controlling to change a zoom speed of the zooming means in accordance with a shutter speed.

An image sensing method according to its second aspect of the present invention is characterized by the following arrangement.

The method comprises the zooming step of performing zooming operation using a zoom lens, the focus adjustment step of correcting movement of a focal plane upon movement of the zoom lens by using a focus lens, the driving step of independently moving the zoom lens and the focus lens parallel to an optical axis, the selection step of selecting a charge storage time of an image sensing element, the shutter speed control step of controlling a timing of the charge storage time of the image sensing element, and the control step of controlling to change a zoom speed in the zooming step in accordance with a shutter speed.

An image sensing apparatus according to its second aspect of the present invention is characterized by the following arrangement.

The apparatus comprises zooming means for performing zooming operation using a zoom lens, focus adjustment means for correcting movement of a focal plane upon movement of the zoom lens by using a focus lens, driving means for independently moving the zoom lens and the focus lens parallel to an optical axis, an image sensing element, selection means for selecting a charge storage time of the image sensing element, shutter speed control means for controlling a timing of the charge storage time of the image sensing element, and control means for controlling to change a zoom speed of the zooming means in accordance with a shutter speed.

A storage medium according to its first aspect of the present invention is characterized by the following arrangement.

The storage medium stores a control program for controlling an image sensing apparatus including zooming means for performing zooming operation, shutter speed control means for controlling a timing of a charge storage time of an image sensing element, and control means for controlling a zoom speed of the zooming means, wherein the control program has a control module for the step of controlling to change the zoom speed of the zooming means in accordance with a shutter speed.

A storage medium according to its second aspect of the present invention is characterized by the following arrangement.

The storage medium stores a control program for controlling an image sensing apparatus comprising zooming means for performing zooming operation using a zoom lens, focus adjustment means for correcting movement of a focal plane upon movement of the zoom lens by using a focus lens, driving means for independently moving the zoom lens and the focus lens parallel to an optical axis, an image sensing element, selection means for selecting a charge storage time of the image sensing element, shutter speed control means for controlling a timing of the charge storage time of the image sensing element, and control means for controlling a zoom speed of the zooming means, wherein the control program has a control module for the step of controlling to change the zoom speed of the zooming means in accordance with a shutter speed.

An image sensing apparatus according to its third aspect of the present invention is characterized by the following arrangement.

The apparatus having an arrangement which can maintain an in-focus state by correcting a displacement of a focal plane during zooming operation comprises signal detection means for extracting a high-frequency component from a video signal obtained by photographing an object, and detecting a sharpness signal, zoom speed detection means for detecting a speed of the zooming operation, and evaluation value calculation means for changing a time during which the sharpness signals are averaged, during the zooming operation, in accordance with the speed of the zooming operation, and calculating a focus evaluation value during the zooming operation in the set averaging time.

An image sensing apparatus according to its fourth aspect of the present invention is characterized by the following arrangement.

The apparatus having an arrangement which can maintain an in-focus state by correcting a displacement of a focal plane during zooming operation comprises signal detection means for extracting a high-frequency component from a video signal obtained by photographing an object, and detecting a sharpness signal, signal extraction means for extracting a luminance signal from the video signal obtained by photographing the object, and evaluation value calculation means for changing a time during which the sharpness signals are averaged, during the zooming operation, in accordance with an object illuminance obtained from the luminance signal, and calculating a focus evaluation value during the zooming operation in the set averaging time.

An image sensing apparatus according to its fifth aspect of the present invention is characterized by the following arrangement.

The apparatus having an arrangement which can maintain an in-focus state by correcting a displacement of a focal plane during zooming operation comprises signal detection means for extracting a high-frequency component from a video signal obtained by photographing an object, and detecting a sharpness signal, shake detection means for detecting a shake of the image sensing apparatus, and evaluation value calculation means for changing a time during which the sharpness signals are averaged, during the zooming operation, in accordance with information from the shake detection means, and calculating a focus evaluation value during the zooming operation in the set averaging time.

An image sensing apparatus according to its sixth aspect of the present invention is characterized by the following arrangement.

The apparatus comprises a first lens group for zooming operation, a second lens group for correcting movement of a focal plane during movement of the first lens group, signal detection means for extracting a high-frequency component from a video signal obtained by photographing an object, and detecting a sharpness signal, zoom speed detection means for detecting a speed of the zooming operation, storage means for storing information of a focus position of the second lens group relative to a position of the first lens group in correspondence with an object distance, moving speed calculation means for obtaining a standard moving speed of the second lens group upon movement of the first lens group on the basis of the information stored in the storage means, speed addition means for adding a correction speed to the standard moving speed of the second lens group, obtained by the moving speed calculation means, during the zooming operation, and focus control means for changing a time during which the sharpness signals are averaged, during the zooming operation, in accordance with the speed of the zooming operation, calculating a focus evaluation value during the zooming operation in the set averaging time, and changing the correction speed to be added to the standard moving speed in accordance with a magnitude of the calculated focus evaluation value.

An image sensing apparatus according to its seventh aspect of the present invention is characterized by the following arrangement.

The apparatus comprises a first lens group for zooming operation, a second lens group for correcting movement of a focal plane during movement of the first lens group, signal detection means for extracting a high-frequency component from a video signal obtained by photographing an object, and detecting a sharpness signal, signal extraction means for extracting a luminance signal from the video signal obtained by photographing the object, storage means for storing information of a focus position of the second lens group relative to a position of the first lens group in correspondence with an object distance, moving speed calculation means for obtaining a standard moving speed of the second lens group upon movement of the first lens group on the basis of the information stored in the storage means, speed addition means for adding a correction speed to the standard moving speed of the second lens group, obtained by the moving speed calculation means, during the zooming operation, and focus control means for changing a time during which the sharpness signals are averaged, during the zooming operation, in accordance with an object illuminance obtained from the luminance signal, calculating a focus evaluation value during the zooming operation in the set averaging time, and changing the correction speed to be added to the standard moving speed in accordance with a magnitude of the calculated focus evaluation value.

An image sensing apparatus according to its eighth aspect of the present invention is characterized by the following arrangement.

The apparatus comprises a first lens group for zooming operation, a second lens group for correcting movement of a focal plane during movement of the first lens group, signal detection means for extracting a high-frequency component from a video signal obtained by photographing an object, and detecting a sharpness signal, shake detection means for detecting a shake of the image sensing apparatus, storage means for storing information of a focus position of the second lens group relative to a position of the first lens group in correspondence with an object distance, moving speed calculation means for obtaining a standard moving speed of the second lens group upon movement of the first lens group on the basis of the information stored in the storage means, speed addition means for adding a correction speed to the standard moving speed of the second lens group, obtained by the moving speed calculation means, during the zooming operation, and focus control means for changing a time during which the sharpness signals are averaged, during the zooming operation, in accordance with information from the shake detection means, calculating a focus evaluation value during the zooming operation in the set averaging time, and changing the correction speed to be added to the standard moving speed in accordance with a magnitude of the calculated focus evaluation value.

A lens control method according to its first aspect of the present invention is characterized by the following arrangement.

The method is used in an image sensing apparatus including a first lens group for zooming operation and a second lens group for correcting movement of a focal plane during movement of the first lens group and adapted to control movement of the second lens group so as to maintain an in-focus state by correcting a displacement of a focal plane upon movement of the first lens group during zooming operation, comprising the steps of averaging sharpness signals corresponding to a predetermined time, each generated by extracting a high-frequency component from a video signal obtained by photographing an object, and calculating a focus evaluation value for determining a moving speed of the second lens group on the basis of the averaged sharpness signal, and changing the averaging time of the sharpness signals during the zooming operation in accordance with a speed of the zooming operation.

A lens control method according to its second aspect of the present invention is characterized by the following arrangement.

The method is used in an image sensing apparatus including a first lens group for zooming operation and a second lens group for correcting movement of a focal plane during movement of the first lens group and adapted to control movement of the second lens group so as to maintain an in-focus state by correcting a displacement of a focal plane upon movement of the first lens group during zooming operation, comprising the steps of averaging sharpness signals corresponding to a predetermined time, each generated by extracting a high-frequency component from a video signal obtained by photographing an object, and calculating a focus evaluation value for determining a moving speed of the second lens group on the basis of the averaged sharpness signal, and changing the averaging time of the sharpness signals during the zooming operation in accordance with an object illuminance obtained from a luminance signal in the video signal obtained by photographing the object.

A lens control method according to its third aspect of the present invention is characterized by the following arrangement.

The method is used in an image sensing apparatus including a first lens group for zooming operation and a second lens group for correcting movement of a focal plane during movement of the first lens group and adapted to control movement of the second lens group so as to maintain an in-focus state by correcting a displacement of a focal plane upon movement of the first lens group during zooming operation, comprising the steps of averaging sharpness signals corresponding to a predetermined time, each generated by extracting a high-frequency component from a video signal obtained by photographing an object, and calculating a focus evaluation value for determining a moving speed of the second lens group on the basis of the averaged sharpness signal, and changing the averaging time of the sharpness signals during the zooming operation in accordance with information from shake detection means for detecting a shake of the image sensing apparatus.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a view showing how the cam locus information in FIG. 7 is stored in a lens control microcomputer (or external memory);

FIG. 9 is a view showing the relationship between the focus lens position and the zoom lens position;

FIGS. 12A to 12D are timing charts showing the relationship between shutter speeds and signals;

DETAILED DESCRIPTION OF THE PREFERRED EMBODIMENTS

Each embodiment of the present invention will be described below with reference to the accompanying drawings.

First Embodiment

The first embodiment of the present invention will be described first with reference to FIGS. 1 to 4.

Figure 1:
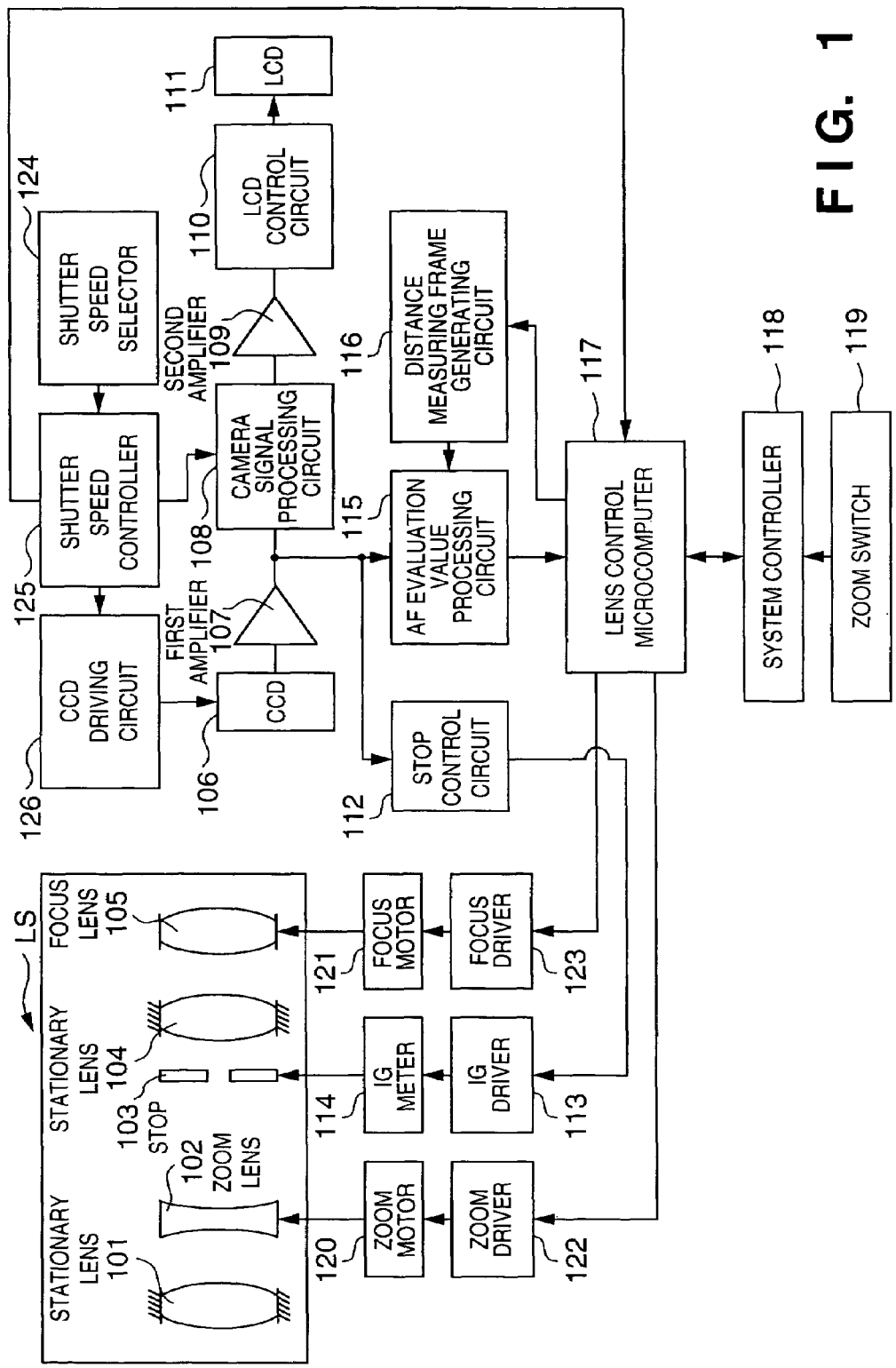
FIG. 1 is a block diagram showing the arrangement of an image sensing apparatus according to the first embodiment of the present invention.

FIG. 1 is a block diagram showing the arrangement of an image sensing apparatus according to the first embodiment of the present invention. Referring to FIG. 1, reference symbol LS denotes an inner focus type lens system. This lens system LS includes the following constituent elements: a stationary first lens group 101, a zoom lens (first lens group) 102 for optical zooming, a stop 103 for light amount adjustment, a stationary second lens group 104, and a focus lens (second lens group) 105 having both a compensation function and a focusing function. Video light transmitted through the lens system LS forms an image on the surface of an image sensing element 106 (to be described later) to be photoelectrically converted into a video signal.

Reference numeral 106 denotes an image sensing element (CCD) for converting a light signal into an electrical signal; 107, a first amplifier (or impedance converter) for amplifying the video signal output from the image sensing element 106; 108, a camera signal processing circuit for performing predetermined processing for the video signal output from the image sensing element 106; 109, a second amplifier for amplifying the video signal processed by the camera signal processing circuit 108 to a predetermined level; 110, an LCD control circuit for controlling a display (LCD: Liquid Crystal Display) (to be described later); and 111, a display (LCD: Liquid Crystal Display) for displaying information.

Reference numeral 112 denotes a stop control circuit; 113, an IG driver; 114, an IG meter; 115, an AF evaluation value processing circuit; and 116, a distance measuring frame generating circuit. The video signal amplified by the first amplifier 107 is sent to the stop control circuit 112 and the AF evaluation value processing circuit 115. The stop control circuit 112 drives the IG driver 113 and the IG meter 114 to control the stop 103 in accordance with the video signal input level, thereby performing light amount adjustment. The AF evaluation value processing circuit 115 extracts a high-frequency component from a luminance signal within the distance measuring frame in accordance with a gate signal from the distance measuring frame generating circuit 116.

Reference numeral 117 denotes a lens control microcomputer for performing drive control of the lens and distance measuring control for a change of the distance measuring area in accordance with the strength of an AF evaluation signal. In addition, the lens control microcomputer 117 communicates with a system control microcomputer (system controller) 118 to exchange information from a zoom switch (zoom SW) 119, which is read by the system controller 118 upon A/D conversion or the like, and zooming information such as a zoom direction and a focal length in zooming operation controlled by the lens control microcomputer 117. The zoom SW 119 takes the form of a unit. A voltage corresponding to the rotational angle of an operation member (not shown) is output from the zoom SW 119. Variable speed zooming is performed in accordance with this output voltage.

Reference numeral 120 denotes a zoom motor for driving the zoom lens 102; 121, a focus motor for driving the focus lens 105; 122, a zoom driver for outputting driving energy to the zoom motor 120 in accordance with a drive instruction output for the zoom lens 102 from the lens control microcomputer 117; and 123, a focus driver for outputting driving energy to the zoom driver 122 in accordance with a drive instruction output for the focus lens 105 from the lens control microcomputer 117.

Reference numeral 124 denotes a shutter speed selector for selecting the shutter speed; 125, a shutter speed controller for controlling the shutter speed; and 126, a CCD driving circuit for driving the image sensing element 106.

The shutter speed data selected by the shutter speed selector 124 is input to the shutter speed controller 125 to set the charge storage time for the image sensing element 106 in accordance with the shutter speed. The charge storage timing data for the image sensing element 106 controlled by the shutter speed controller 125 is input to the camera signal processing circuit 108 and the lens control microcomputer 117.

A method of driving the zoom motor 120 and the focus motor 121 will be described next, assuming that these motors are stepping motors.

The lens control microcomputer 117 determines the driving speeds for the zoom motor 120 and the focus motor 121 by program processing, and sends the speeds as rotational frequency signals for the motors 120 and 121 to the zoom driver 122 and the focus driver 123, respectively. The lens control microcomputer 117 also sends drive/stop instruction signals and rotating direction instruction signals for the motors 120 and 121 to the drivers 122 and 123.

The drive/stop instruction signal and rotating direction instruction signal for the zoom motor 120 mainly correspond to the state of the zoom SW 119. Such signals for the focus motor 121 correspond to drive instructions determined within the lens control microcomputer 117 in AF (Automatic Focus) processing and zooming. Each of the drivers 122 and 123 sets the four motor exciting phases to forward and reverse rotation phases in accordance with the rotating direction instruction signal, and outputs voltages (currents) for the four motor exciting phases while changing them in accordance with the received rotational frequency signal, thereby ON/OFF-controlling the output to each of the motors 120 and 121 in accordance with the drive/stop instruction signal while controlling the rotating direction and rotational frequency of each of the motors 120 and 121.

The operation of the image sensing apparatus according to this embodiment will be described next with reference to FIG. 2.

Figure 2:
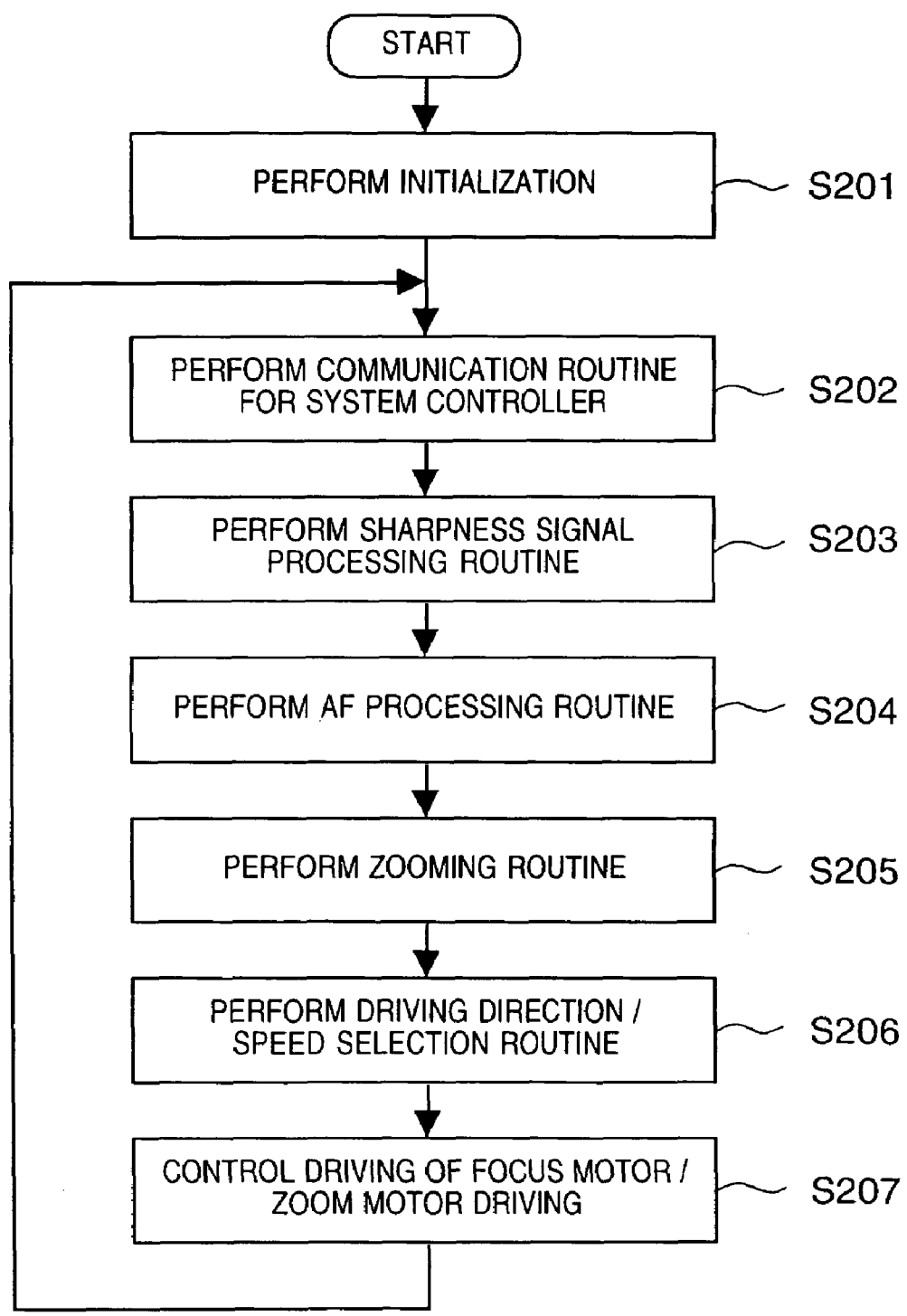
FIG. 2 is a flow chart showing a procedure for lens control operation in the image sensing apparatus according to the first embodiment of the present invention.

FIG. 2 is a flow chart showing a procedure followed by the image sensing apparatus according to this embodiment. The control flow chart shown in FIG. 2 is processed in the lens control microcomputer 117.

Step S201 is an initialization routine, in which a RAM (Random-Access Memory) and various types of ports in the lens control microcomputer 117 are initialized. Step S202 is a communication routine, in which information from the zoom SW 119 and zooming information such as the position of the zoom lens 102 are exchanged. Step S203 is a sharpness signal processing routine, in which the sharpness signal of an AF evaluation signal is processed in accordance with the signal obtained from the AF evaluation value processing circuit 115. Step S204 is an AF processing routine, in which automatic focus adjustment is performed in accordance with a change in the AF evaluation signal.

Figure 6:
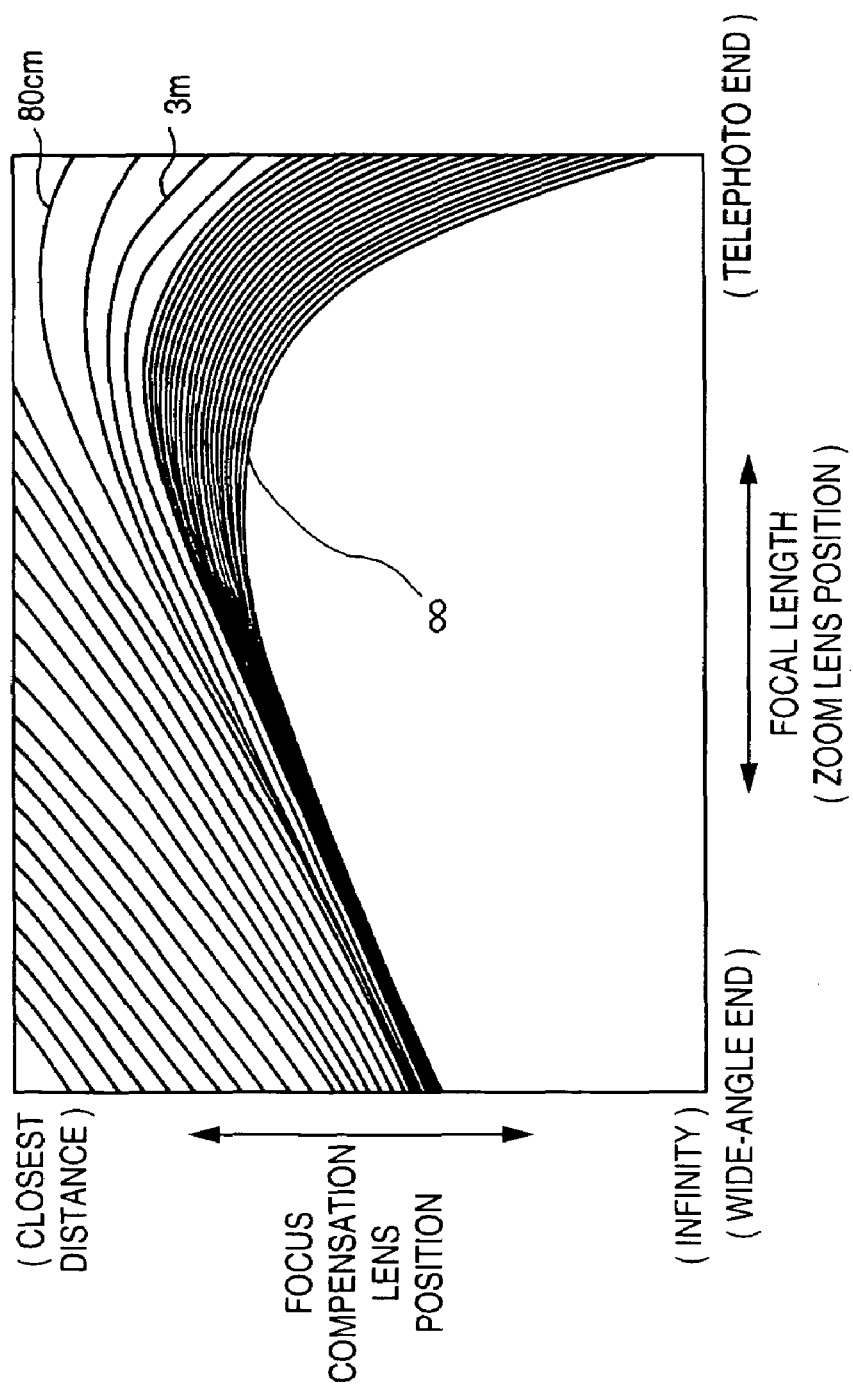
FIG. 6 is a graph showing the relationship between the focus lens position and the focal length (zoom lens position)

Step S205 is a zooming routine, which is a compensation processing routine for maintaining an in-focus state in zooming operation. In this routine, the driving direction and speed for the focus lens 105 are calculated so as to trace a cam locus like the one shown in FIG. 6. This calculation method will be described in detail later. Step S206 is a driving direction and speed selection routine, in which driving directions and speeds to be used are selected from those calculated for the zoom lens 102 and focus lens 105 in steps S204 and S205 in accordance with the AF (Automatic Focus) mode, zooming operation, or the like so as to prevent the lenses from exceeding the telephoto end, wide-angle end, closest focusing distance, and infinity, which are set by software, thereby preventing the lenses from bumping against the lens mechanical ends.

Step S207 is a routine for performing drive control on the zoom motor 120 and the focus motor 121. In this routine, control signals are output to the zoom motor 120 and the focus motor 121 in accordance with the data selected in step S206, thereby controlling the driving/stopping of the zoom lens 102 and the focus lens 105. Upon completion of the processing in step S207, the flow returns to step S202.

A series of operations in FIG. 2 is executed in synchronism with a vertical sync period (a standby state continues until the next vertical sync signal arrives in the processing in step S202).

The zooming routine in step S205 in FIG. 2 will be described in detail next with reference to FIG. 3.

Figure 3:
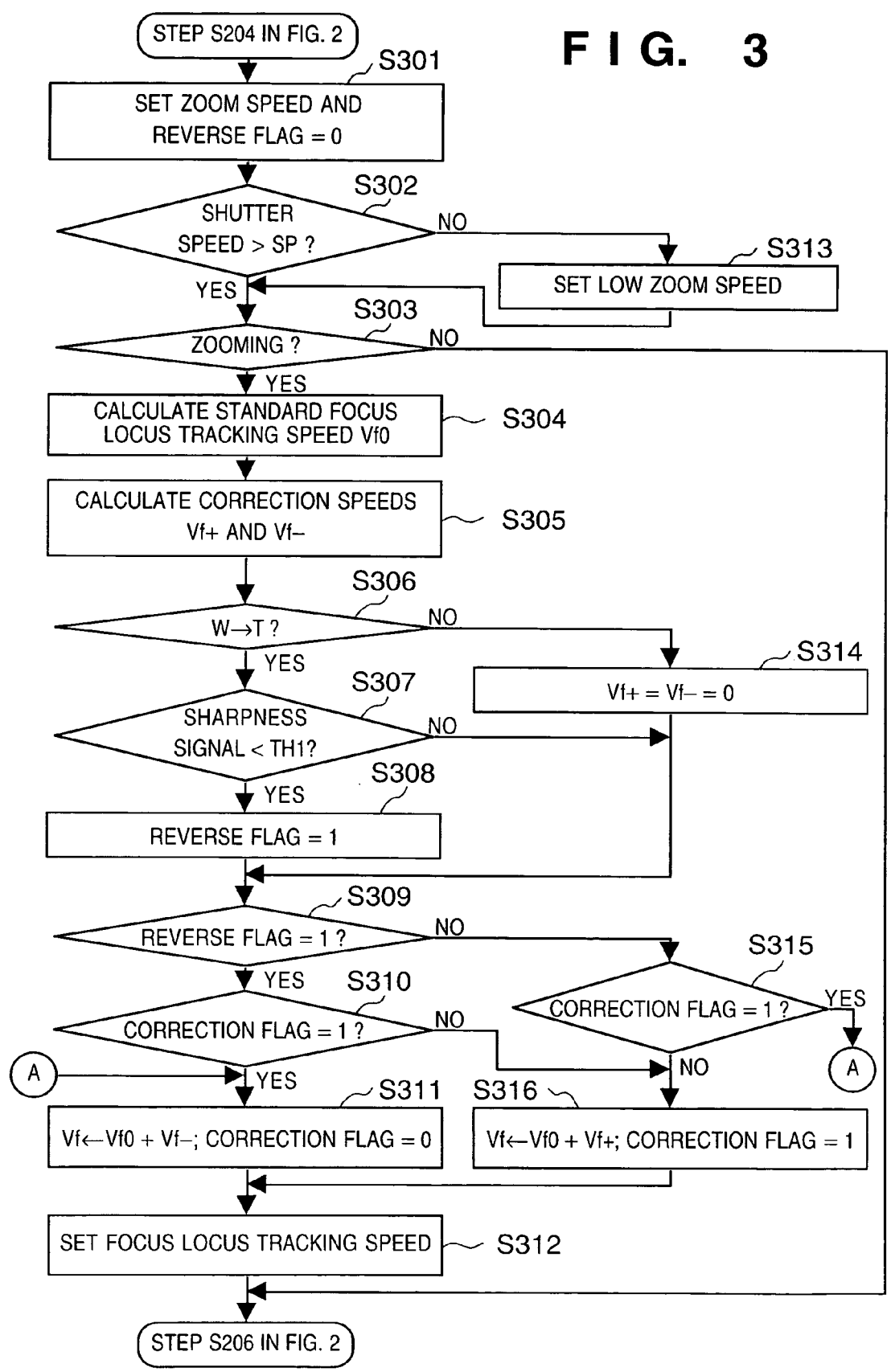
FIG. 3 is a flow chart showing a procedure for lens control operation in the image sensing apparatus according to the first embodiment of the present invention.

FIG. 3 is a flow chart showing a procedure for the zooming routine in step S205 in FIG. 2.

When the AF processing routine in step S204 in FIG. 2 is complete, the zoom speed is set in accordance with information from the zoom SW 119, which is obtained upon communication with the system controller 118, and a reverse flag is set to 0 in step S301 in FIG. 3. In step S302, it is checked, on the basis of information from the shutter speed selector 124 in FIG. 1, whether the shutter speed is higher than a given speed SP. If YES in step S302, it is checked in step S303 whether zooming is being performed. If YES in step S303, a standard cam locus is set from the positions of the zoom lens 102 and focus lens 105 at this time and a stored representative cam table to zoom in step S304.

Figure 7:
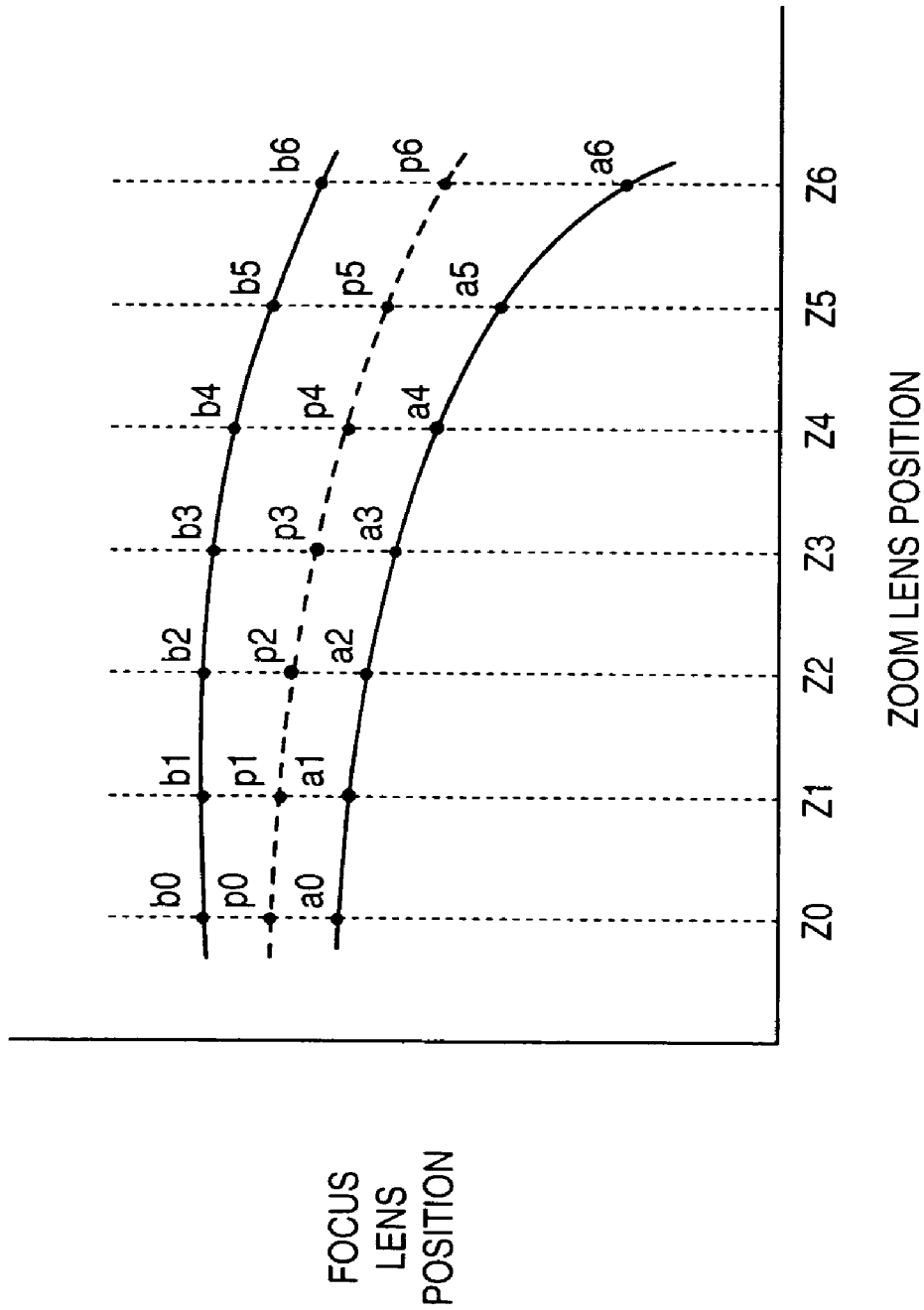
FIG. 7 is a graph showing the in-focus locus (cam locus) of the focus lens at movement of the zoom lens for each object distance.

Referring to FIG. 7, letting p0 be the current position, the ratio obtained by internally dividing a line segment b0–a(β) with p0 is given by $$p0-a0/b0-a0=\alpha/\beta$$

Referring to FIG. 8, since a0=A(0, 0) and b0=A(1, 0), a locus is obtained by connecting points that internally divide the distance defined by n=0, 1 with v=0 at the ratio of α/β from the wide-angle side to the telephoto side (v=0, 1, . . . , s). A standard cam locus can therefore be set by calculating n, α, and β from the positions of the zoom lens 102 and focus lens 105 at this time. A point p1 is then calculated from the standard cam locus (n, α, β) and the locus data stored in the lens control microcomputer 117 according to equation (1) described in the prior art. A standard tracking speed Vf0 of the focus lens 105 is calculated by using the point p1.

Figure 10A:
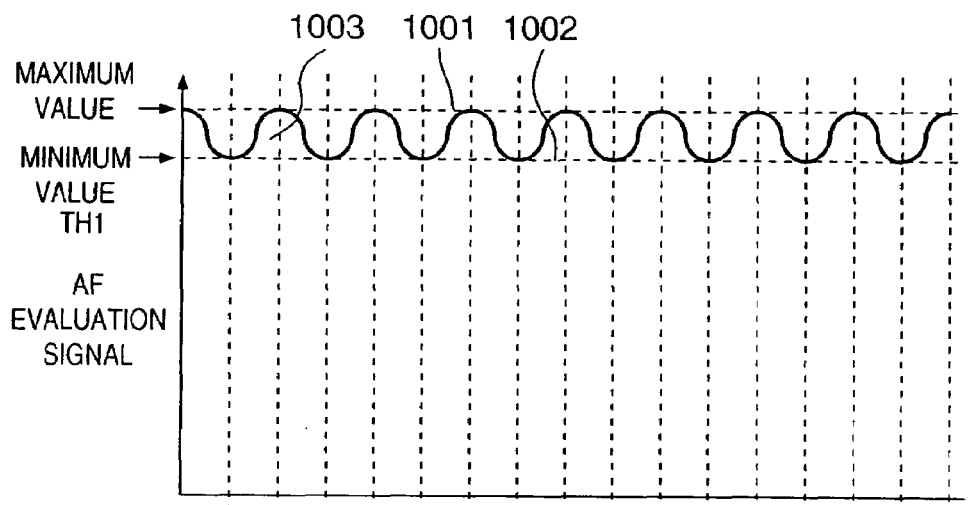
FIGS. 10A and 10B are graphs for explaining an example of conventional locus tracking methods.
Figure 10B:
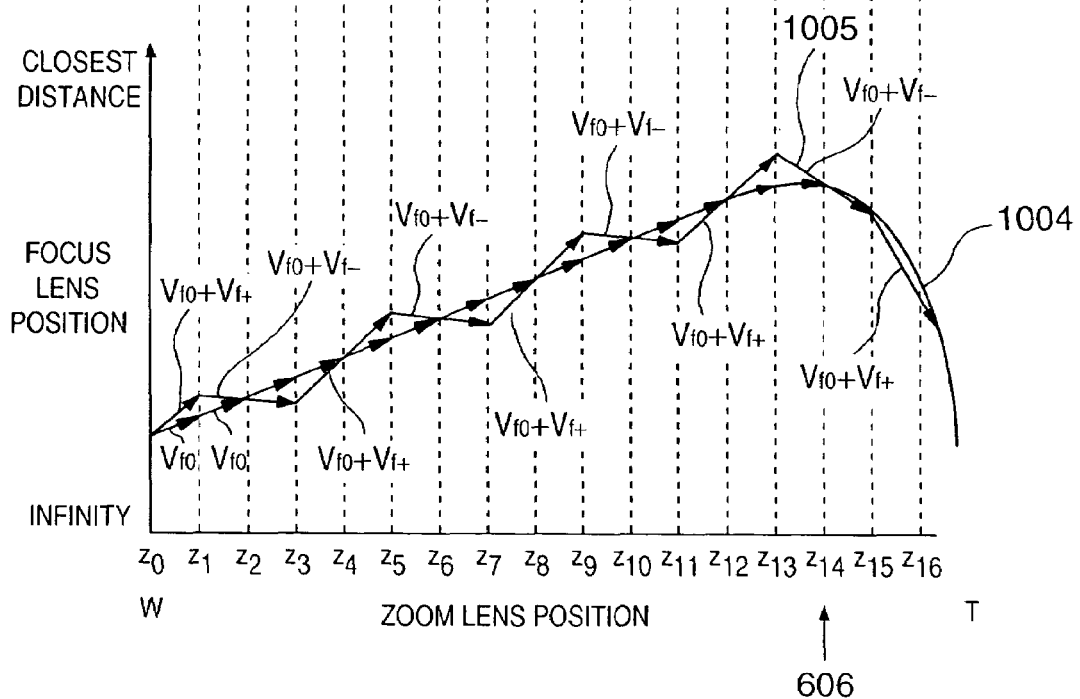
Figure 11A:
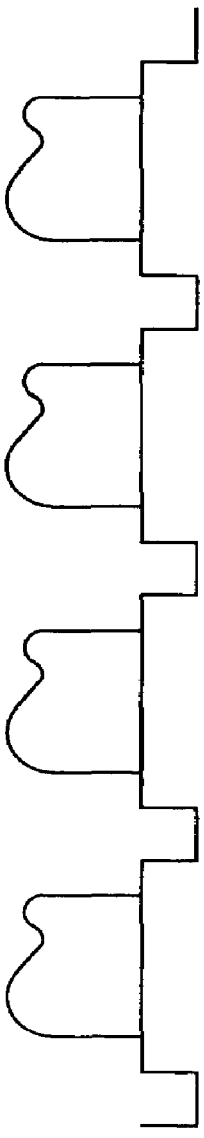
FIGS. 11A and 11B are timing charts showing the relationship between shutter speeds and video signals.
Figure 11B:
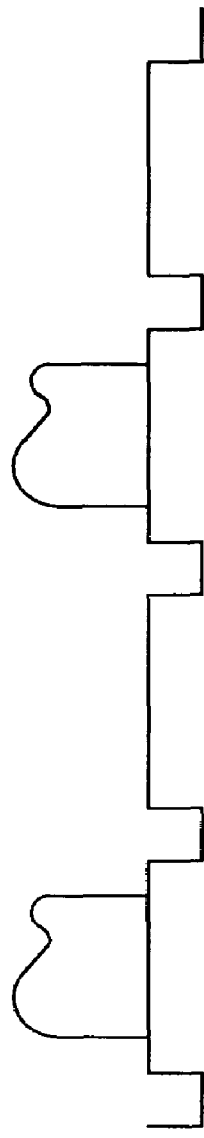

In step S305, correction speeds Vf+ and Vf− at which the focus lens 105 is driven in the + and − directions in FIGS. 10A and 10B are calculated. These correction speeds Vf+ and Vf− are calculated as follows.

Figure 4:
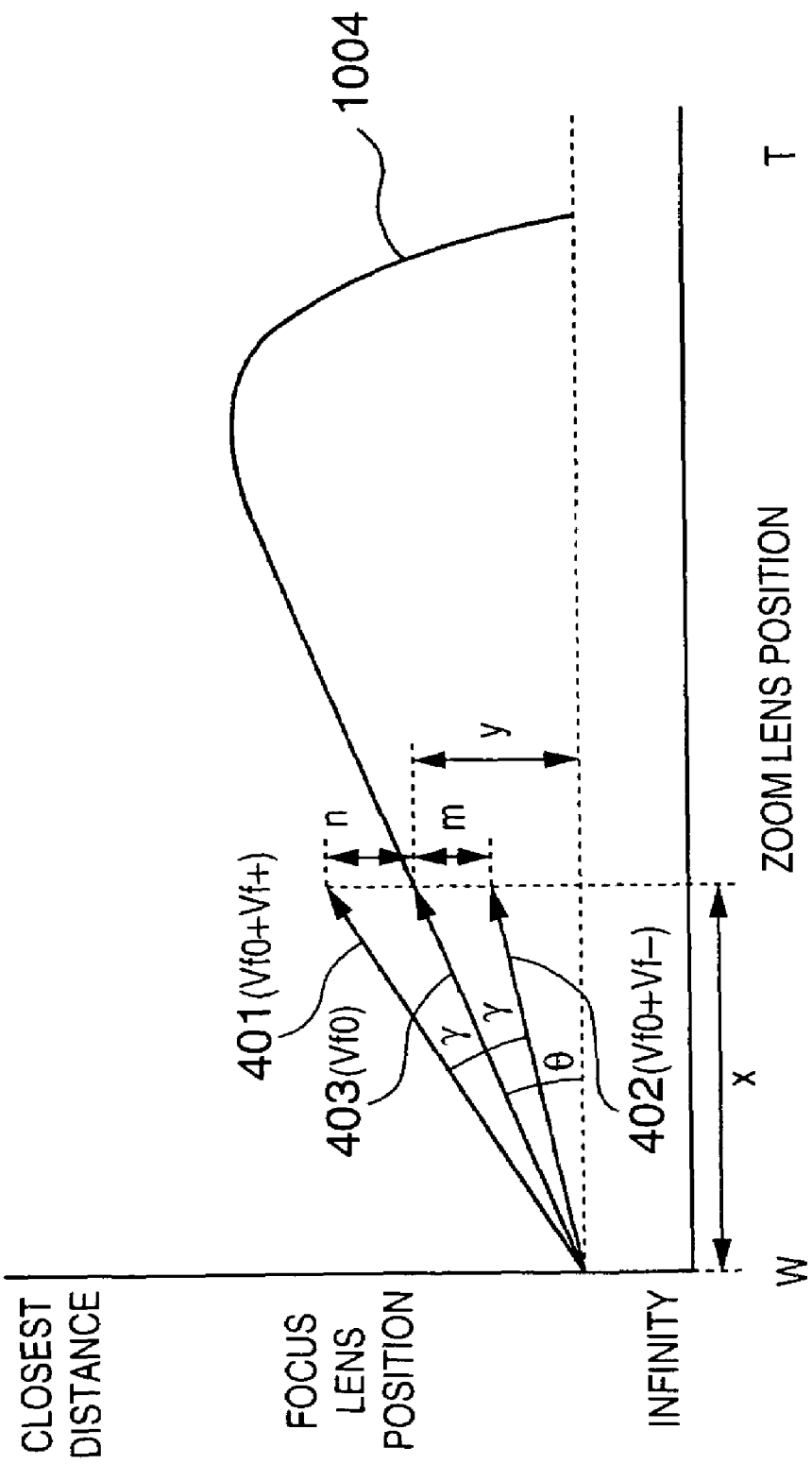
FIG. 4 is a graph showing the relationship between the focus lens position and the zoom lens position.
Figure 5:
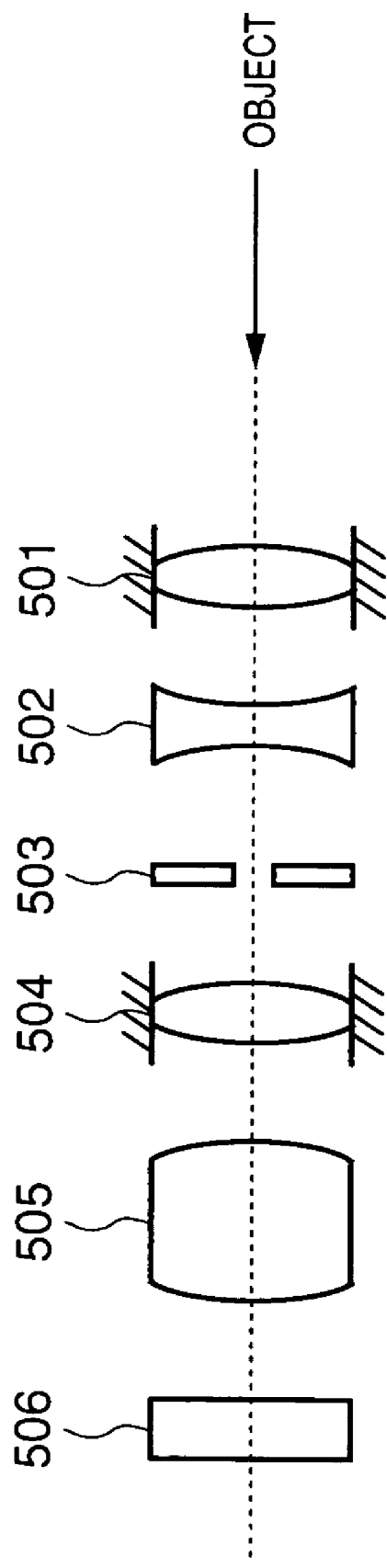
FIG. 5 is a view showing the arrangement of an inner focus type lens system in a conventional image sensing apparatus.

FIG. 4 is a graph for explaining a method of calculating the correction speeds Vf+ and Vf−. Referring to FIG. 4, the ordinates indicates the position of the focus lens 105; and the abscissa, the position of the zoom lens 102.

Referring to FIG. 4, reference numeral 1004 denotes a cam locus to be traced. Assume that the focusing speed set when the position of the focus lens 105 changes by a value y as the position of the zoom lens 102 changes by a value x is the standard speed Vf0 (denoted by reference numeral 403 in FIG. 4), and the focusing speeds set when the position of the focus lens 105 changes by values n and m as the position of the zoom lens 102 changes by the value x are respectively the correction speeds Vf+ and Vf− to be obtained. In this case, the values n and m are determined such that a speed 401 in FIG. 4, which is obtained by adding the correction speed Vf+ to the standard speed Vf0 and is used to drive the lens in the +direction, and a speed 402 in FIG. 4, which is obtained by adding the correction speed Vf− to the standard speed Vf0 and is used to drive the lens in the −direction, respectively have direction vectors separated from the direction vector of the standard speed Vf0 by an equal angle γ.

First of all, the value n and m are obtained. From the graph of FIG. 4, we have:

$$\tan\theta=y/x,\ \tan(\theta-\gamma)=(y-m)/x,\ \tan(\theta+\gamma)=(y+n)/x \quad (2)$$

$$\tan(\theta\pm\gamma)=(\tan\theta\pm\tan\gamma)/(1\pm\tan\theta\cdot\tan\gamma) \quad (3)$$

According to equations (2) and (3), $$m=(x2+y2)/(x/K+y) \quad (4)$$

$$n=(x2+y2)/(x/k-y) \quad (5)$$

for tanγ=k

The values n and m are calculated according to equations (2) and (3).

If the position of the zoom lens 102 changes by the value x per unit time, the respective values can be defined as follows: zoom speed vz=x, standard focusing speed Vf0=y, correction speed Vf+=n, and correction speed Vf−=m. The correction speeds vf+ and Vf− can be obtained from equations (4) and (5).

Referring to FIG. 3 again, it is checked in step S306 whether zooming is from the wide-angle side (W) to the telephoto side (T). If YES in step S306, it is checked in step S307 whether the current sharpness integral signal level is lower than a minimum value (TH1). If YES in step S307, the reverse flag is set at 1 in step S308. It is then checked in step S309 whether the reverse flag is set at 1. If YES in step S309, it is checked in step S310 whether a correction flag is set at 1. If YES in step S310, the correction flag is set at 0 (−direction) in step S311.

focusing speed Vf=Vf0−Vf−(Vf0≧0)

=Vf0+Vf−(Vf0<0)

for Vf−≧0

After a speed vf2 is set for the focus motor 121 in step S312, the zoom motor 120 and the focus motor 121 are actually driven in steps S206 and S207 in FIG. 2.

If it is determined in step S302 that the shutter speed is lower than the speed SP, the zoom speed set in step S301 is changed to a low speed in step S313, and the flow advances to step S303. If it is determined in step S303 that zooming is not being performed, the processing in FIG. 3 is terminated, and the zoom motor 120 and the focus motor 121 are actually driven in steps S206 and S207 in FIG. 2.

If it is determined in step S306 that zooming is not from the wide-angle side (W) to the telephoto side (T), correction speed Vf+=0 and Vf−=0 are set in step S314, and the flow advances to step S309. If it is determined in step S307 that the current sharpness integral signal level is equal to or higher than the minimum value (TH1), the flow advances to step S309.

If it is determined in step S309 that the reverse flag is not at 1, it is checked in step S315 whether the correction flag is at 1. If NO in step S315 or S310, the correction flag is set at 1 (+direction) in step S316.

focusing speed Vf=Vf0+Vf+(Vf0≧0)=

Vf0−Vf+(Vf0<0)

for Vf+≧0

When the processing in step S316 is complete, the flow advances to step S312.

As described above, when the focus position is unknown, and zooming is performed while the AF evaluation value is increased/decreased, the focus tracking performance at a low shutter speed, i.e., a speed lower than the normal shutter speed of 1/60 sec, can be improved by decreasing the zoom speed below the normal zoom speed.

Second Embodiment

The second embodiment of the present invention will be described next.

As shown in FIGS. 11A to 12D, at a shutter speed of 1/60 sec or higher, a sharpness signal can be obtained every vertical sync period. At 1/30 sec, however, a sharpness signal is obtained every two vertical sync periods, and at 1/15 sec, a sharpness signal is obtained every four vertical sync periods. That is, as the shutter speed decreases, the period at which a sharpness signal is obtained is prolonged. If the time required for zooming (zoom speed) from the wide-angle side to the telephoto side remains the same, the AF evaluation (sharpness signal) obtained during zooming from the telephoto side to the wide-angle side decreases as the shutter speed decreases. When, therefore, the shutter speed is low, the same focus tracking performance during zooming as that at a high shutter speed can be obtained by decreasing the zoom speed in proportion to the shutter speed.

If, therefore, it is determined in step S302 in FIG. 3 that the shutter speed is lower than a given speed SP, zooming operation that can track an object without blur can be performed, regardless of how low the shutter speed is, by setting the zoom speed in accordance with the shutter speed instead of resetting the zoom speed to a low speed.

As described in detail above, according to the first and second embodiments, by determining the zoom speed in accordance with the shutter speed, object focus tracking can be performed during zooming regardless of the shutter speed.

In addition, when the shutter speed is lower than the normal speed, the object focus tracking performance during zooming can be improved by decreasing the zoom speed.

Furthermore, according to storage media of the first and second embodiments, an image sensing apparatus like the one described above can be smoothly controlled.

Third Embodiment

Figure 13:
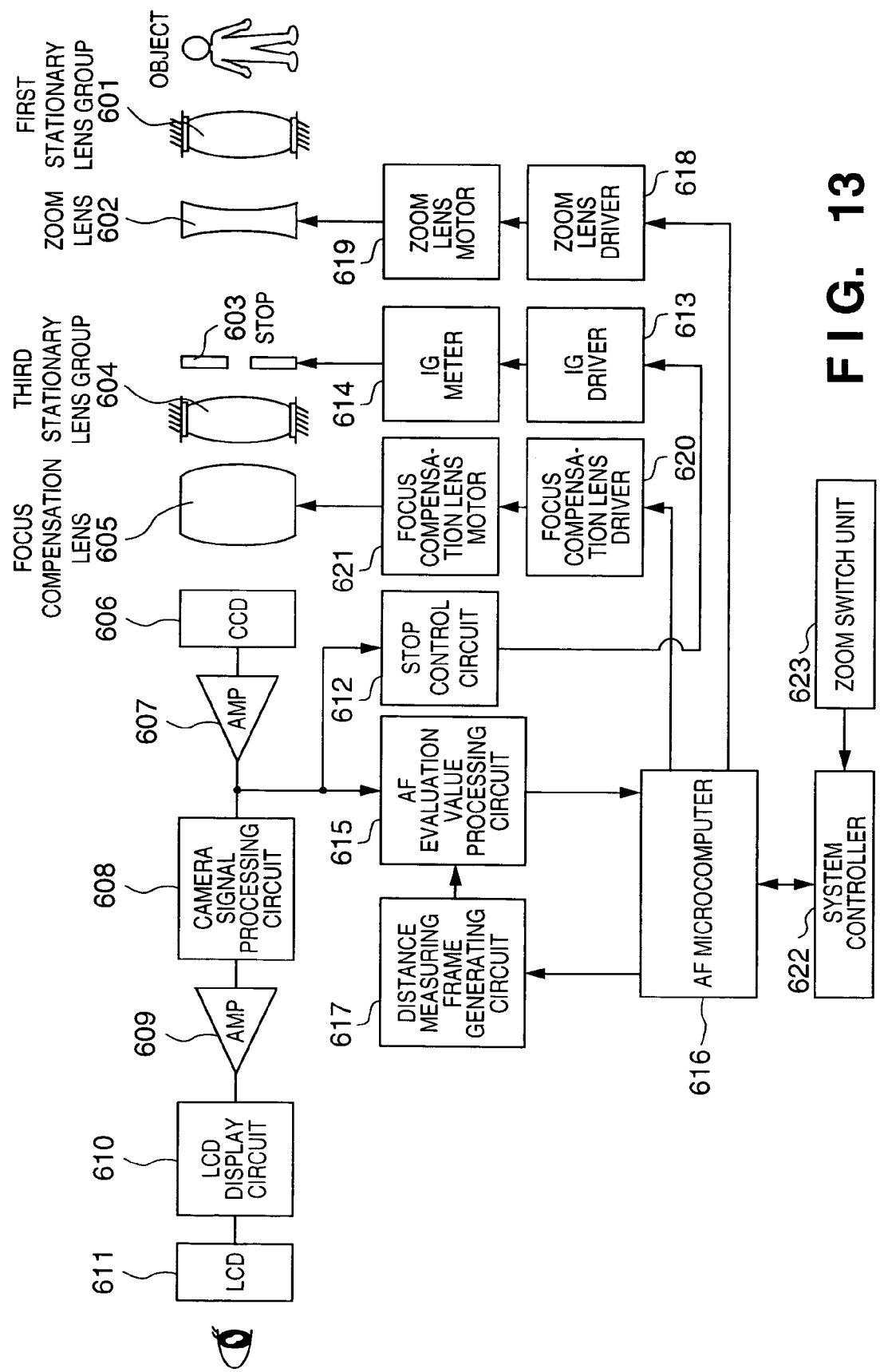
FIG. 13 is a block diagram showing the arrangement of an image sensing apparatus according to the third to fifth embodiments of the present invention.

FIG. 13 is a block diagram showing the arrangement of an image sensing apparatus according to the third embodiment of the present invention. Referring to FIG. 13, reference numerals 601, 602, 603, 604, and 605 respectively denote the building elements of an inner focus type lens system, and more specifically, a stationary front-element lens group, a second lens group for zooming, a stop, a third stationary lens group, and a fourth lens group having both a compensation function and a focusing function.

Object light transmitted through this lens system forms an image on an image sensing element 606 such as a CCD and photoelectrically converted into a video signal. This video signal is amplified by an amplifier or impedance converter 607 and input to a camera signal processing circuit 608. The video signal having undergone predetermined signal processing is amplified to a prescribed level by an amplifier 609 and processed by an LCD display circuit 610. The resultant signal is displayed as a photographic image on an LCD 611.

The video signal amplified by the amplifier or impedance converter 607 is also sent to a stop control circuit 612 and an AF evaluation value processing circuit 615. The stop control circuit 612 drives an IG driver 613 and an IG meter 614 to control the stop 603 in accordance with the input level of the video signal, thereby adjusting the light amount. The AF evaluation value processing circuit 615 extracts only the high-frequency component from the video signal within a distance measuring frame in accordance with a gate signal from a distance measuring frame generating circuit 617, and performs predetermined processing to generate an AF evaluation signal.

Reference numeral 616 denotes an AF microcomputer for performing lens drive control and distance measuring frame control to change the distance measuring area in accordance with the strength of the AF evaluation signal supplied from the AF evaluation value processing circuit 615. In addition, the AF microcomputer 616 communicates with a system control microcomputer (system controller) 622 to exchange information from a zoom switch 623, which is loaded into the system controller 622 upon A/D conversion or the like, zooming information such as a zoom direction and focal length in zooming controlled by the AF microcomputer 616, and the like.

Figure 14A:
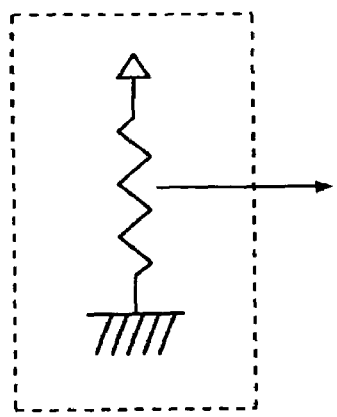
FIGS. 14A and 14B are views respectively showing the arrangement and characteristics of a zoom switch.
Figure 14B:
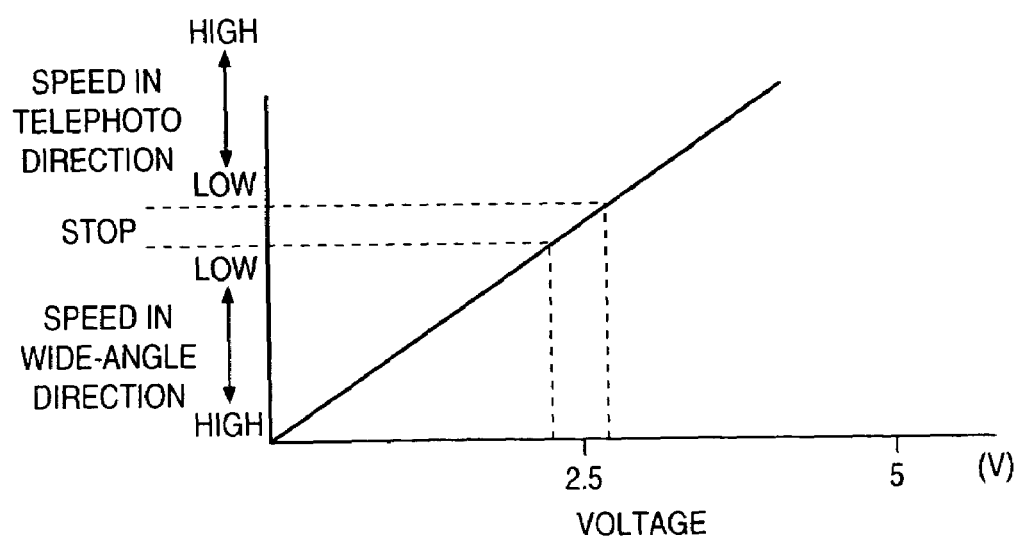

The above zoom switch 623 takes the form of a unit. A voltage corresponding to the rotational angle of an operation member is output from the zoom SW 119. FIGS. 14A and 14B respectively show the arrangement of the zoom SW as a unit and its characteristics. As shown in FIG. 14A, the zoom switch 623 is comprised of a variable resistor to output a voltage in accordance with the rotational angle of the operation member. Variable speed zooming is done in accordance with the magnitude of this output voltage.

FIG. 14B shows the relationship between the output voltage from the zoom SW and the variable zoom speed. Within the output voltage range, a zooming stopping zone is located near 2.5 V, i.e., the middle voltage. When the output voltage is lower than this voltage, zooming is performed in the wide-angle direction. The zoom speed increases with a decrease in the output voltage, and vice versa. When the output voltage is higher than the stopping voltage, zooming is performed in the telephoto direction. The zoom speed increases with an increase in the output voltage, and vice versa. The output voltage and the zoom speed have a linear relationship in both the wide-angle and telephoto directions.

Reference numeral 618 denotes a zoom lens driver for outputting driving energy to the lens driving motor in accordance with a drive instruction for the zoom lens 602 which is output from the AF microcomputer 616; 621, a focus compensation lens driver for outputting driving energy to the lens driving motor in accordance with a driving instruction for the focus lens 605 which is output from the AF microcomputer 616; and 619 and 620, lens driving motors for driving the zoom lens 602 and the focus lens 605.

A method of driving the motors will be described below, assuming that the lens driving motors are stepping motors.

The AF microcomputer 616 determines the driving speeds for the zoom lens motor 619 and the focus compensation lens motor 621 by program processing, and sends the speeds as rotational frequency signals for the respective stepping motors to the zoom lens driver 618 and the focus compensation lens driver 620, respectively. The AF microcomputer 616 also sends drive/stop instructions and rotating direction instructions for the motors 619 and 621 to the drivers 618 and 620.

The drive/stop instruction and rotating direction instruction for the zoom lens motor 619 are output mainly in accordance with the state of the zoom switch unit 623. Such signals for the focus compensation lens motor 621 are output in accordance with drive instructions determined within the AF microcomputer 616 in AF processing and zooming. Each motor driver sets the four motor exciting phases to forward and reverse rotation phases in accordance with the received rotating direction signal, and outputs voltages (currents) for the four motor exciting phases while changing them in accordance with the received rotational frequency signal, thereby ON/OFF-controlling the output to each motor in accordance with the drive/stop instruction while controlling the rotating direction and rotational frequency of each motor.

Figure 15:
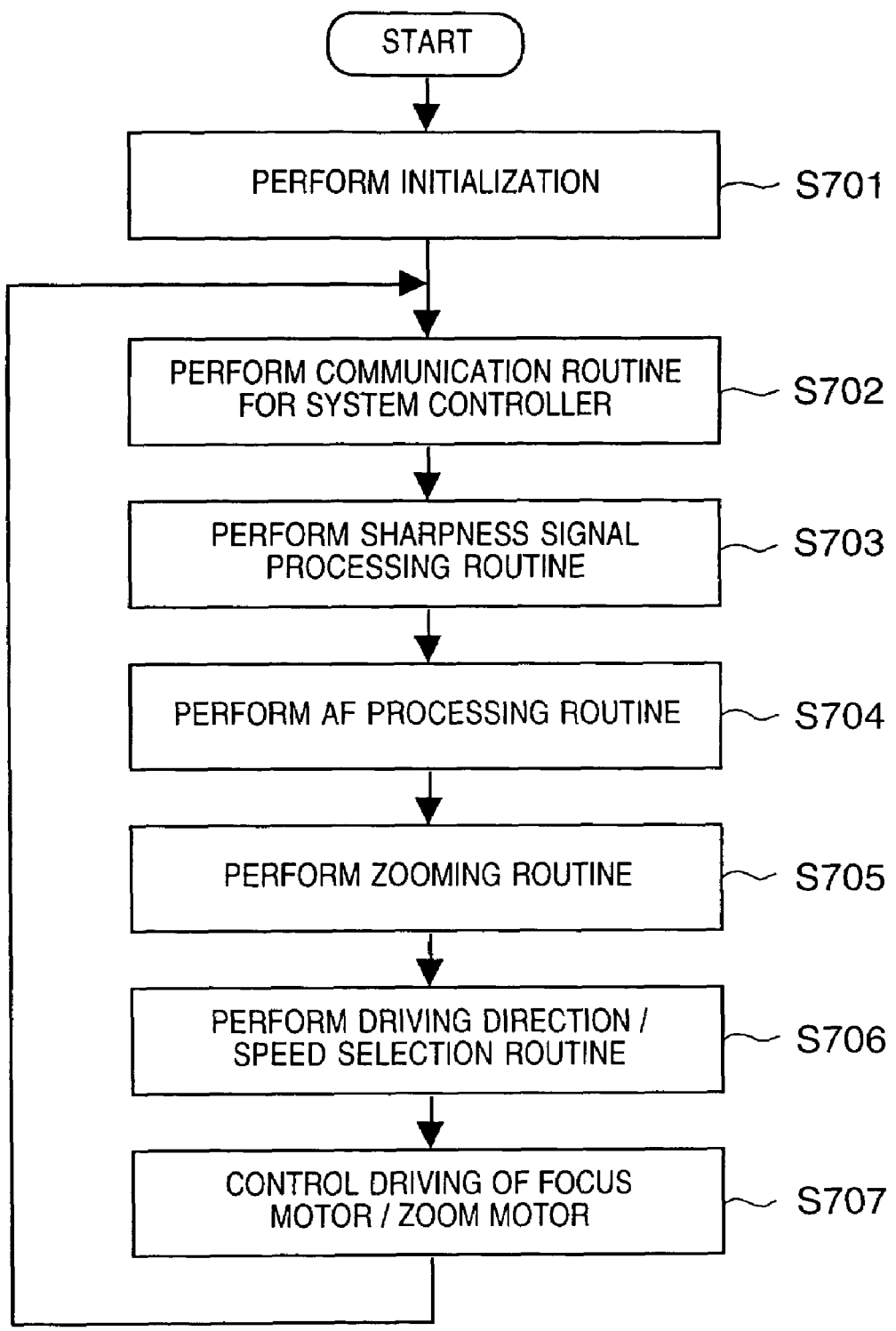
FIG. 15 is a flow chart showing a procedure for control operation performed by an AF microcomputer according to the third to sixth embodiments.

FIG. 15 is a flow chart showing a procedure for executing the third embodiment. This processing is performed in the AF microcomputer 616. Step S701 is an initialization routine, in which a RAM and various types of ports (not shown) in the AF microcomputer 616 are initialized. Step S702 is a communication routine, in which information from the zoom SW unit 623 and zooming information such as a zoom lens position are exchanged.

Step S703 is a sharpness signal processing routine, in which the sharpness signal of an AF evaluation signal is processed in accordance with the signal obtained from the AF evaluation value processing circuit 615. Step S704 is an AF processing routine, in which automatic focus adjustment is performed in accordance with a change in the AF evaluation signal processed in step S703.

Step S705 is a zooming routine, in which compensation processing is performed to maintain an in-focus state in zooming operation. In this routine, the driving direction and speed for the focus lens 605 are calculated to trace a cam locus like the one shown in FIG. 6. This operation will be described in detail later with reference to FIG. 16.

In step S706, driving directions and speeds to be used are selected from those calculated for zooming and focusing in steps S704 and S705 in accordance with the AF mode, zooming operation, or the like so as to prevent the lenses from exceeding the telephoto end, wide-angle end, closest focusing distance, and infinity, which are set by software, thereby preventing the lenses from overshooting the lens mechanical ends.

In step S707, control signals are output to the zoom lens driver 618 and the focus compensation lens driver 620 in accordance with the information about the driving directions and speeds for focusing which are determined in step S706, thereby controlling the driving/stopping of the lenses. The control returns to step S702 after step S707. A series of operations in FIG. 15 is executed in synchronism with the vertical sync period (a standby state continues until the next vertical sync signal arrives in the processing in step S702).

Figure 16:
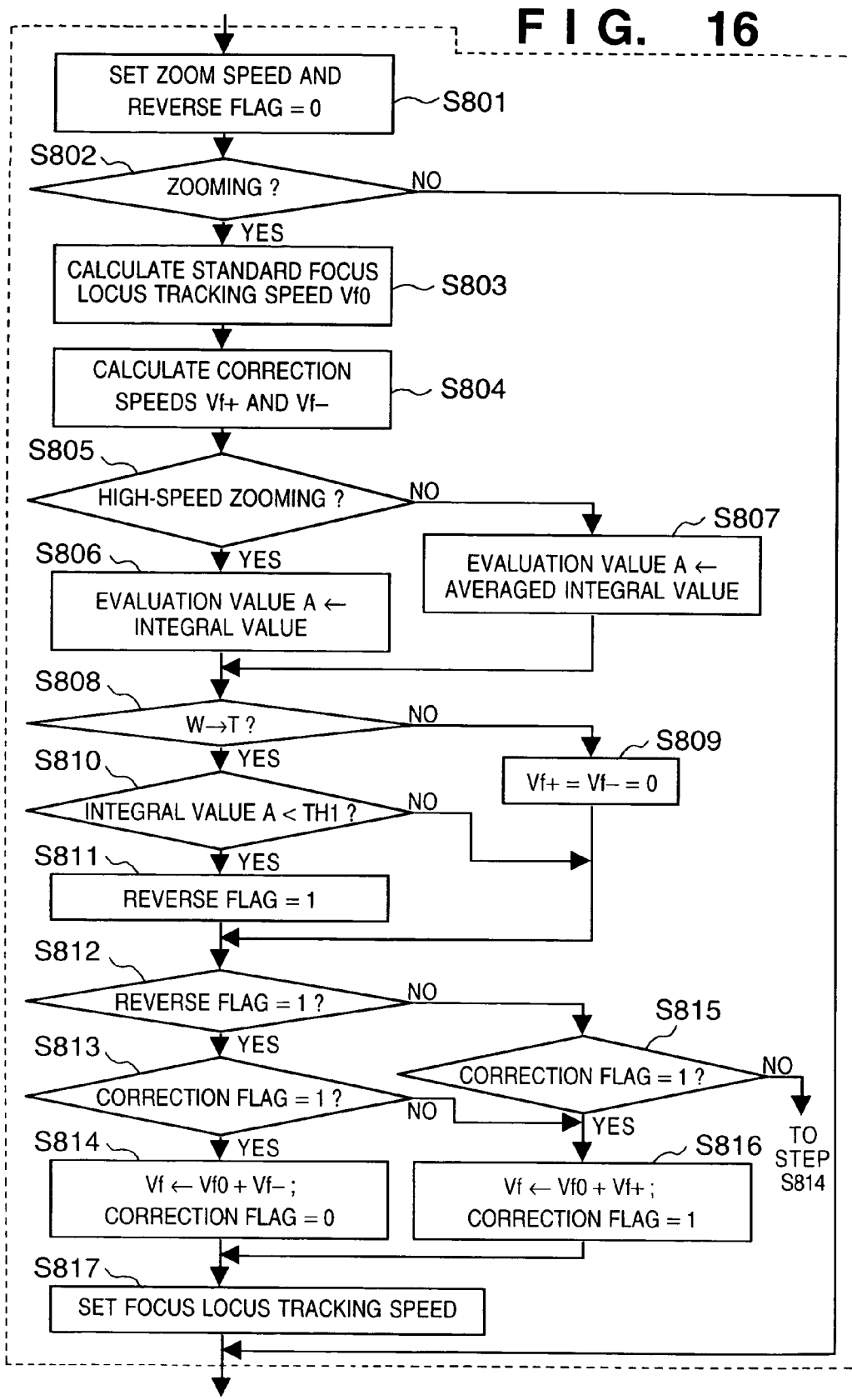
FIG. 16 is a flow chart showing a procedure for control operation performed by the AF microcomputer according to the third embodiment, and more specifically, processing for the zooming routine in FIG. 15.

FIG. 16 is a flow chart showing a procedure for executing the third embodiment, and more specifically, the contents of the processing in the subroutine in step S705 in FIG. 15.

First of all, in step S801, the zoom speed is set on the basis of the information from the zoom switch 623, which is obtained upon communication with the system controller 622, and a reverse flag is set to "0". It is then checked in step S802 whether zooming is being performed. If NO in step S802, the flow goes out of the zooming routine.

If it is determined in step S802 that zooming is being performed, the flow advances to step S803 to determine the standard cam locus on the basis of the positions of the zoom lens 602 and focus lens 605 at this time and the contents of a representative cam locus table stored in advance. Referring to FIG. 7, letting p0 be the current position of the focus lens 605, the ratio obtained by internally dividing a line segment b0–a0($\beta$) with a point p0 is given by $$p0-a0/b0-a0 = \alpha/\beta$$

Referring to FIG. 8, since a0=A00 and b0=A10, a locus is obtained by connecting points that internally divide the distance defined by n=0, 1 with v=0 at the ratio of $\alpha/\beta$ from the wide-angle side to the telephoto side (v=0, 1, ..., s). A standard cam locus can therefore be set by calculating n, $\alpha$, and $\beta$ from the positions of the zoom lens 602 and focus lens 605 at this time. A point p1 is then calculated from the standard cam locus (n, $\alpha$, $\beta$) and the locus data stored in the AF microcomputer 616 according to equation (1) described in the prior art. A standard tracking speed Vf0 of the focus lens 605 is calculated by using the point p1.

In step S804, correction speeds Vf+ and Vf– at which the focus lens 605 is driven in the + and – directions in FIG. 10B are calculated. These correction speeds Vf+ and Vf– are calculated as follows.

As described above in the first embodiment, FIG. 4 is a graph for explaining a method of calculating the correction speeds vf+ and vf–. Referring to FIG. 4, the ordinates indicates the position of the focus lens; and the abscissa, the position of the zoom lens. Reference numeral 1004 denotes a cam locus to be traced.

Assume that the focusing speed set when the position of the focus lens 605 changes by a value y as the position of the zoom lens 602 changes by a value x is the standard speed Vf0 (403), and the focusing speeds set when the position of the focus lens 605 changes by values n and m as the position of the zoom lens 602 changes by the value x are respectively the correction speeds Vf+ and Vf– to be obtained. In this case, the values n and m are determined such that a speed 401, which is obtained by adding the correction speed Vf+ to the standard speed Vf0 and is used to drive the lens in the +direction, and a speed 402, which is obtained by adding the correction speed Vf− to the standard speed Vf0 and is used to drive the lens in the—direction, respectively have direction vectors separated from the direction vector of the standard speed Vf0 by an equal angle γ.

First of all, the value n and m are obtained. According to the graph of FIG. 4, $$\tan\theta = y/x, \tan(\theta-\gamma)=(y-m)/x, \tan(\theta+\gamma)=(y+n)/x \quad (6)$$

$$\tan(\theta\pm\gamma)=(\tan\theta\cdot\tan\gamma)/(1\pm\tan\theta\cdot\tan\gamma) \quad (7)$$

According to equations (6) and (7), $$m=(x2+y2)/(x/K+y) \quad (8)$$

$$n=(x2+y2)/(x/k-y) \quad (9)$$

for tan γ=k

Therefore, the value γ and m are obtained from the equations.

The angle γ is changed to 0.8 times the angle on the wide-angle side as a reference in the middle region and to twice the reference angle in the telephoto region in accordance with the focal length. With this setting, the incrementing/decrementing period of the sharpness signal level that changes in accordance with the driven state of the focus lens 605 can be kept constant with respect to a predetermined focus lens position change amount. This decreases the possibility of missing a locus to be traced during zooming.

In this embodiment, a value k is stored in a table in the memory of the AF microcomputer 616 in correspondence with the value of the angle γ, and is read out, as needed, to solve equations (8) and (9). If the position of the zoom lens 602 changes by x per unit time, the respective values can be defined as follows: zoom speed vz=x, standard focusing speed Vf0=y, correction speed Vf+=n, and correction speed Vf−=m. The correction speeds Vf+ and vf− can be obtained from equations (8) and (9).

In step S805, it is checked whether the zoom speed set in step S801 is high or low. If high-speed zooming is determined, the flow advances to step S806 to substitute the integral value of sharpness signals obtained in the vertical sync period for a focus evaluation value A to be used for zooming. If low-speed zooming is determined, the flow advances to step S807 to substitute the average of the integral values of sharpness signals from the previous vertical sync period to the current vertical sync period for the focus evaluation value A.

It is then checked in step S808 whether zooming is from the wide-angle side to the telephoto side. If NO in step S808, the correction speeds are set as Vf+=0 and vf−=0 in step S809, and the flow jumps to step S812. If YES in step S808, it is checked in step S810 whether the current sharpness signal level (focus evaluation value A) is lower than a threshold TH1. If NO in step S810, the flow jumps to step S812. If YES in step S810, the reverse flag is set to "1".

In step S812, it is checked whether the reverse flag is at "1". If YES in step S812, it is checked in step S813 whether the correction flag is at "1". In this case, the correction flag indicates whether cam locus tracking is in the + direction or − direction. If NO in step S813, the correction flag is set to"1" (+ direction) in step S816, and the focusing speed Vf is set as follows:

$$Vf=Vf0+Vf+(Vf0\geq 0)=Vf0-Vf+(Vf0<0)$$

for Vf+≧0

If YES in step S813, the correction flag is set to "0" in step S814, and the focusing speed Vf is set as follows:

$$Vf=Vf0-Vf-(Vf0\geq 0)=Vf0+Vf-(Vf0<0)$$

for Vf−≧0

If NO in step S812, i.e., the reverse flag is not at "1", it is checked in step S815, as in step S813, whether the correction flag is at "1". If YES in step S815, the flow advances to step S816. If NO in step S815, the flow advances to step S814. Finally, the focus motor speed Vf is set in step S817. With the above operation, the zooming routine in step S705 in FIG. 15 is complete. Subsequently, in steps S706 and S707, the motors are actually driven.

As described above, according to the third embodiment, when the focus position is unknown, and zooming is performed while the focus evaluation value is increased/decreased, a sharpness integral signal (at the current moment) in the current vertical sync period is used as the evaluation value in high-speed zooming. In low-speed zooming, the average of sharpness signal integral values from the previous vertical sync period to the current vertical sync period is used as the evaluation value. With this operation, the response characteristics of an evaluation signal are improved in high-speed zooming. In low-speed zooming, focusing can be performed while noise due to camera shakes is removed. Therefore, the focus tracking performance both in high-speed zooming and low-speed zooming can be improved.

Fourth Embodiment

According to the method of the third embodiment, as an evaluation signal for focus tracking in zooming from the wide-angle side to the telephoto side, a sharpness integral signal (at the current moment) in the current vertical sync period is used in high-speed zooming, whereas the average of sharpness signal integral values from the previous vertical sync period to the current vertical sync period is used as this evaluation value in low-speed zooming, thereby improving the focus tracking performance in zooming.

The method of the third embodiment is, however, associated with only two zoom speeds for high-speed zooming and low-speed zooming. In the fourth embodiment, therefore, a method associated with multiple zoom speeds will be described.

Figure 17:
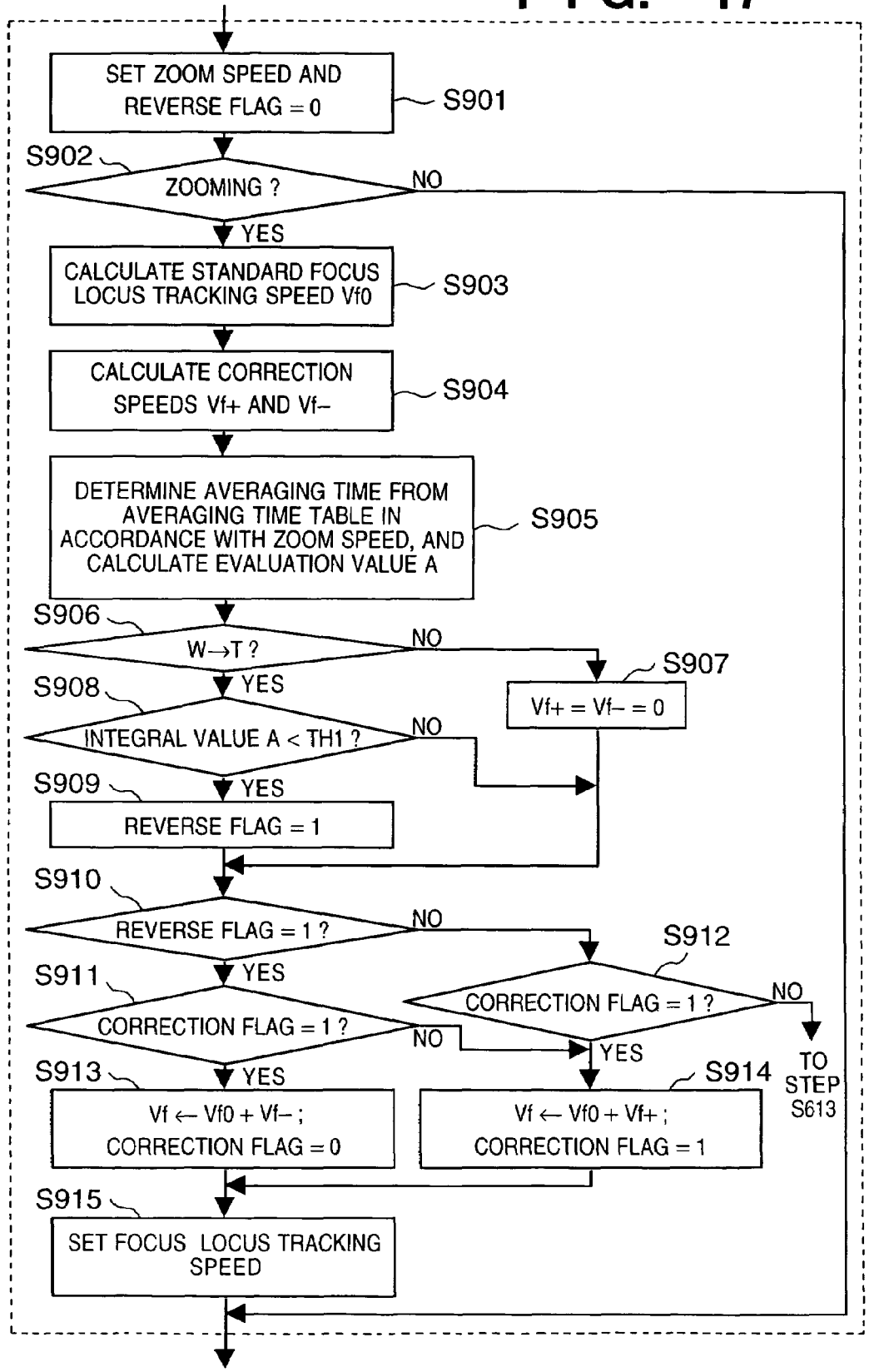
FIG. 17 is a flow chart showing a procedure for control operation performed by an AF microcomputer according to the fourth embodiment, and more specifically, processing for the zooming routine in FIG. 15.

FIG. 17 is a flow chart showing a procedure for executing this embodiment, and more specifically, the subroutine in step S705 in FIG. 15. The fourth embodiment differs from the third embodiment in that the processing in step S905 replaces the processing in steps S805 to S807 in FIG. 16. In step S905, an average time is determined from an average time table set in accordance with zoom speeds, and a focus evaluation value A is calculated. The following is an example of the average time table:

Zoom Speed 1 2 3 4 5 6 low-speed side high-speed side

Average Time 3 3 2 2 1 1 (vertical sync period)

When, for example, the zoom speed is "6", i.e., the highest speed, the average time is one vertical sync period, and the integral value of sharpness signals obtained in the current vertical sync period is used as the evaluation value A. When the zoom speed is "3", i.e., the middle speed, the average of the integral values of sharpness signals in two vertical sync periods is used as the evaluation value A. When the zoom speed is "1", i.e., the lowest speed, the average of the integral values of sharpness signals in three vertical sync periods is used as the evaluation value A. Note that this average time may be set to be lower than three vertical sync period in accordance with the zoom speed. The processing in steps S906 to S915 is the same as that in steps S808 to S817 in FIG. 16.

As described above, according to the fourth embodiment, to calculate the evaluation value A used for focusing during zooming, the response characteristics of an evaluation value are improved in high-speed zooming. In low-speed zooming, the average time for the integral value of sharpness signals is slightly changed in accordance with multiple zoom speeds so as to remove noise due to camera shakes and the like, thereby obtaining proper evaluation values A in zooming at various zoom speeds. This can improve the precision in in-focus locus selection and focus tracking.

Fifth Embodiment

According to the methods of the third and fourth embodiments, as an evaluation signal for focus tracking during zooming from the wide-angle side to the telephoto side, the average of the integral values of sharpness signals is used in accordance with the zoom speed, thereby removing noise values due to object changes and changes such as camera shakes.

In the methods of the third and fourth embodiments, however, since the average time is determined in accordance with only the zoom speed, when the level of a video signal is low at a low illuminance, and electrical noise increases after the signal is amplified by an amplification circuit, no good effect can be obtained. In the fifth embodiment, therefore, a method of changing the average time required to calculate the evaluation value for focus tracking in accordance with illuminance will be described.

Figure 18:
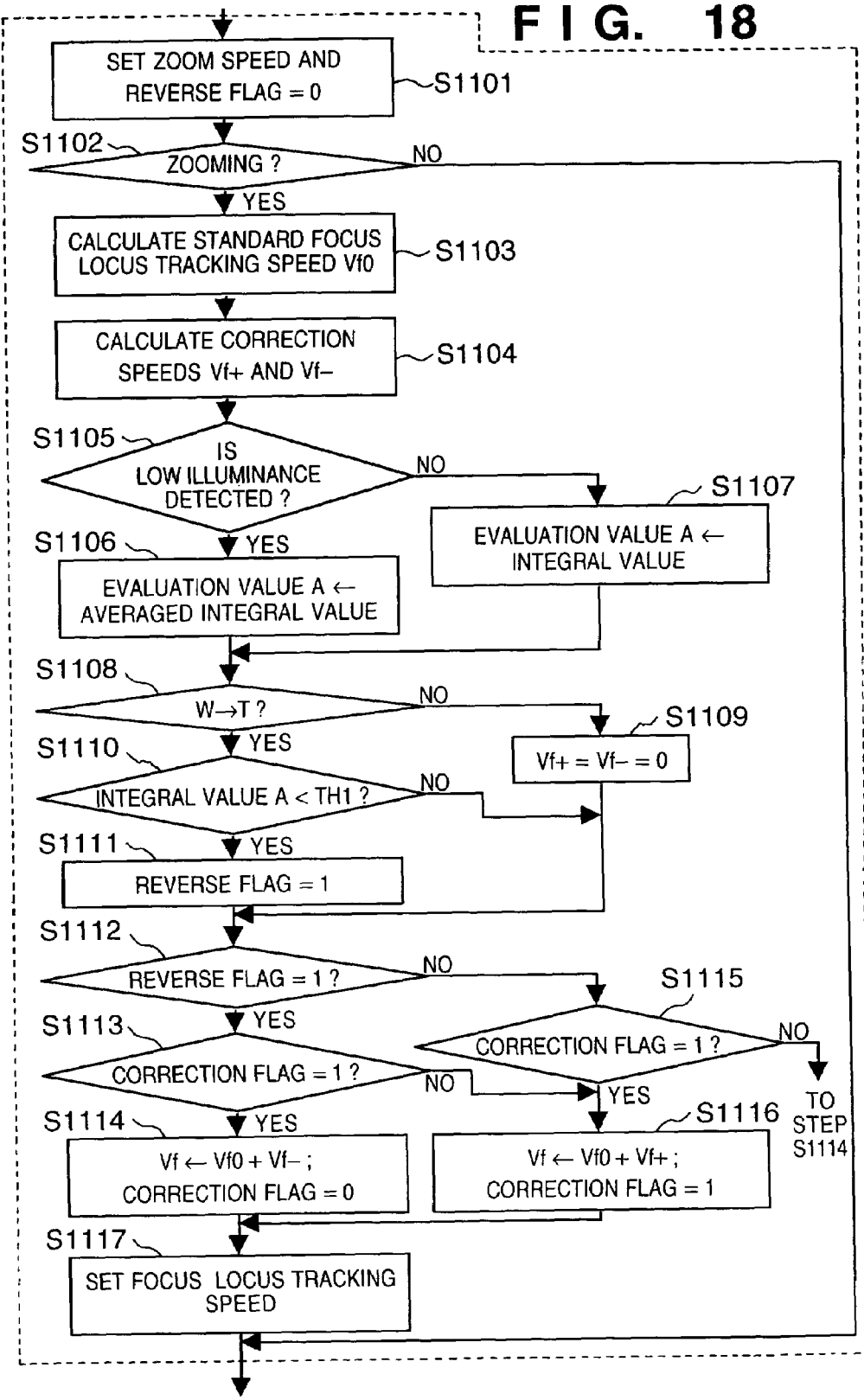
FIG. 18 is a flow chart showing a procedure for control operation performed by an AF microcomputer according to the fifth embodiment, and more specifically, processing for the zooming routine in FIG. 15.

FIG. 18 is a flow chart showing a procedure for executing this embodiment, and more specifically, the subroutine in step S705 in FIG. 15. The fifth embodiment differs from the third embodiment in that the processing in steps S1105 to S1107 replaces the processing in steps S805 to S807 in FIG. 16.

In step S1105, it is checked, on the basis of the magnitude of the luminance signal obtained by a CCD 606 in FIG. 13, whether the illuminance is low. If the luminance signal is smaller than a predetermined value, it is determined that the illuminance is low, and vice versa. If YES in step S1105, the average of the integral values of sharpness signals in only predetermined vertical sync periods is set as an evaluation value A.

If NO in step S1105, a sharpness integral signal in the current the vertical sync period is set as the evaluation value A. The processing in the subsequent steps, i.e., steps S1108 to S1117, is the same as that in steps S808 to S817 in FIG. 16.

As described above, according to the fifth embodiment, when the evaluation value A for focusing during zooming is to be generated, an appropriate evaluation value A free from electrical noise can be obtained by changing the average time for the integral value of sharpness signals in accordance with illuminance information. This can improve the performance in in-focus locus selection and focus tracking.

Sixth Embodiment

According to the methods of the third and fourth embodiments, as an evaluation signal for focus tracking during zooming from the wide-angle side to the telephoto side, the average of sharpness integral signals is used in accordance with the zoom speed. The methods of the third and fourth embodiments, however, are mainly effective when changes in sharpness signal are caused by only object changes and movement of the lens. When, for example, the level of a sharpness integral signal decreases owing to external noise due to camera shakes and the like, the signal undergoes a complicated change. In the sixth embodiment, therefore, a method of changing the average time for a sharpness integral signal in accordance with external information such as camera shake information will be described.

Figure 19:
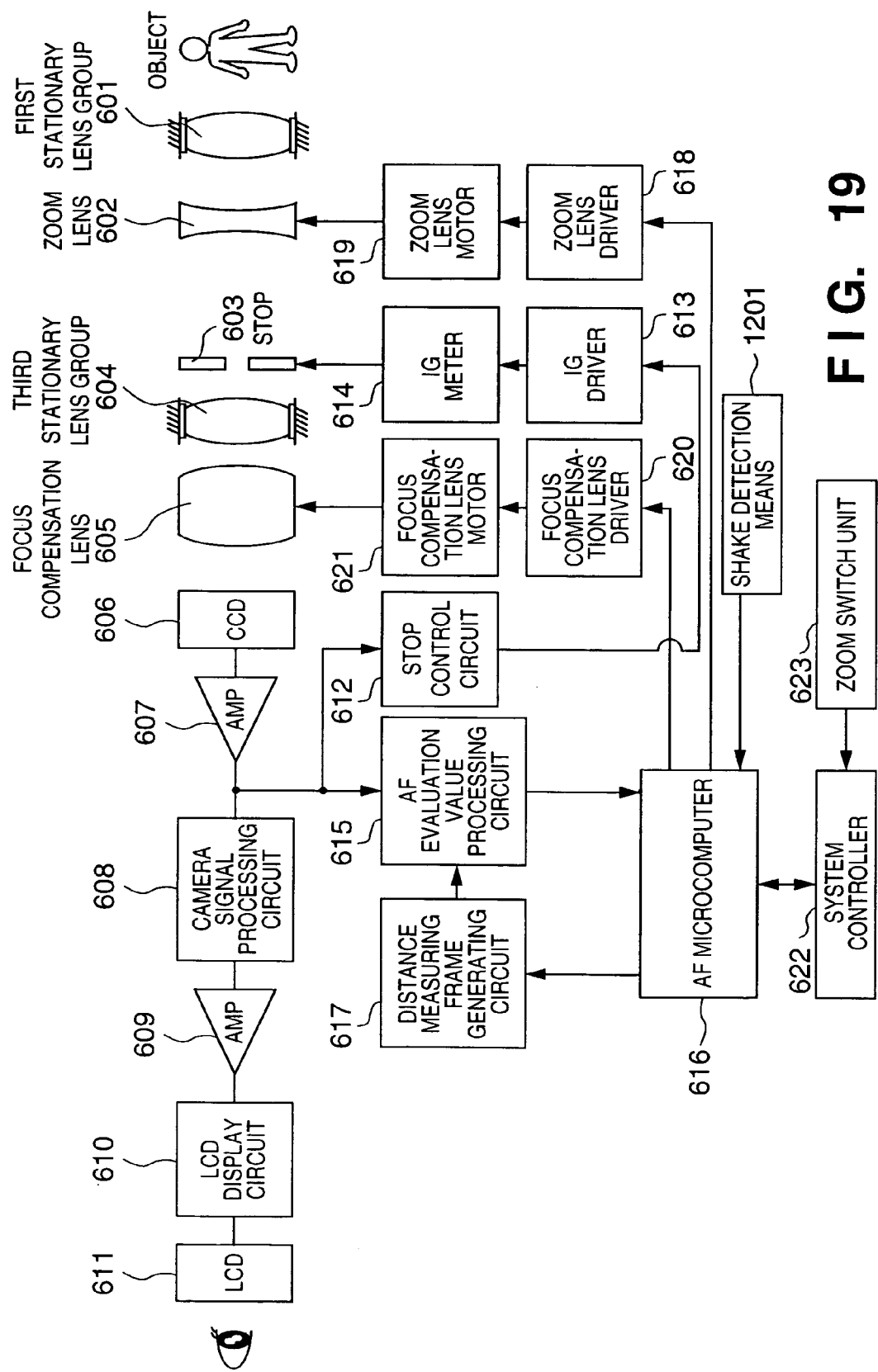
FIG. 19 is a block diagram showing the arrangement of an image sensing apparatus according to the sixth embodiment of the present invention.
Figure 20:
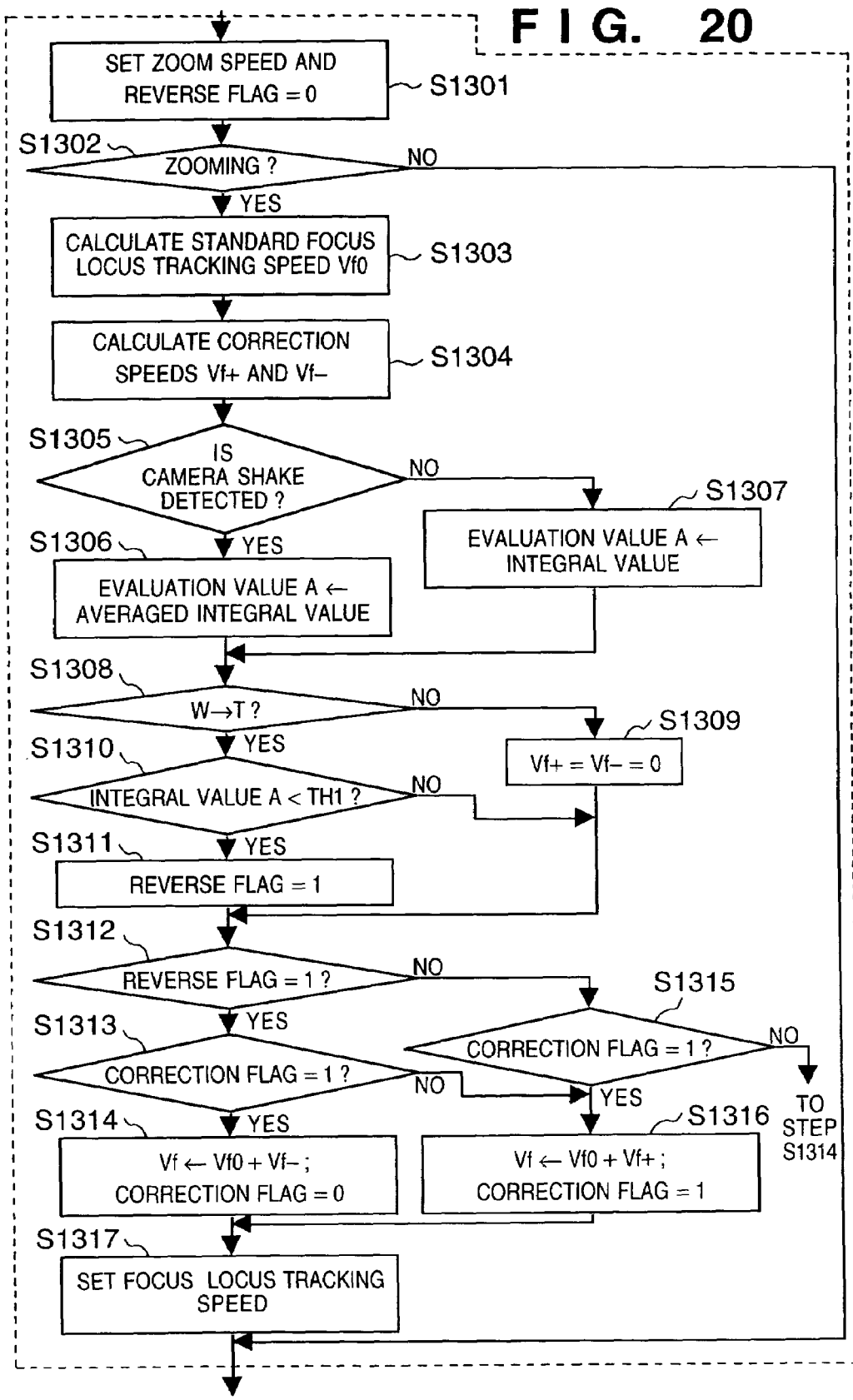
FIG. 20 is a flow chart showing a procedure for control operation performed by an AF microcomputer according to the sixth embodiment, and more specifically, processing for the zooming routine in FIG. 15.

FIG. 19 shows the characteristic feature of an image sensing apparatus of this embodiment. FIG. 20 is a flow chart showing a procedure for executing the embodiment, and more specifically, the subroutine in step S705 in FIG. 15. The sixth embodiment differs from the third embodiment in that the arrangement of the sixth embodiment in FIG. 19 includes a shake detection means 1201 using an angular speed sensor, acceleration sensor, or the like in addition to the arrangement in FIG. 13, and the processing in steps S1305 to S1307 replaces the processing in steps S805 to S807 in FIG. 16.

In step S1305 in FIG. 20, it is checked whether camera shake information is obtained by the shake detection means 1201 in FIG. 19. If YES in step S1305, the flow advances to step S1306 to set the average of sharpness integral values in only predetermined vertical sync periods as the evaluation value A. If NO in step S1305, a sharpness integral signal in the current vertical sync period is set as the evaluation value A. The processing in the subsequent steps, i.e., steps S1308 to S1317, is the same as that in steps S808 to S817 in FIG. 16.

As described above, according to the sixth embodiment, when the evaluation value A for focusing during zooming is to be generated, an appropriate evaluation value A free from noise due to camera shakes can be obtained by changing the average time for the integral value of sharpness signals in accordance with the camera shake information. This can improve the performance in in-focus locus selection and focus tracking.

As described above, according to the third to sixth embodiments, when the focus lens tracks the object while the sharpness signal level is increased/decreased during zooming, sharpness signals are averaged while the average time for the sharpness signals is changed in accordance with the zoom speed. With this operation, the movement of the focus lens can be controlled in accordance with the focus evaluation value corresponding to the zoom speed set at this time, thereby improving the in-focus locus selection performance and tracking performance with respect to a change in locus in zooming.

In addition, when the focus lens tracks the object while the sharpness signal level is increased/decreased during zooming, the average of sharpness signals is made variable by changing the average time for the sharpness signals in accordance with the illuminance on the object. With this operation, the movement of the focus lens can be controlled in accordance with a focus evaluation value corresponding to the illuminance on the object photographed at this time, thereby improving the in-focus locus selection performance and tracking performance with respect to a change in locus in zooming.

Furthermore, when the focus lens tracks the object while the sharpness signal level is increased/decreased during zooming, the average of sharpness signals is made variable by changing the average time for the sharpness signals in accordance with external information such as camera shake information. With this operation, the movement of the focus lens can be controlled in accordance with the focus evaluation value corresponding to the presence/absence of camera shakes, thereby improving the in-focus locus selection performance and tracking performance with respect to external noise during zooming.

Note that the image sensing apparatus according to each embodiment of the present invention can be applied to various types of cameras such as a video camera, VTR, and digital video camera. The functions of the respective embodiments described above are mainly implemented by control operation performed by the AF microcomputer and the system controller. This control operation is performed in accordance with a program stored in a recording medium (not shown).

In this case, the program itself realizes the functions of the above-mentioned embodiments, and the program itself and a means for supplying the program to the computer, e.g., a storage medium which stores the program code, constitute the present invention. As the storage medium for storing the program, for example, a floppy disk, hard disk, optical disk, magneto-optical disk, CD-ROM, magnetic tape, nonvolatile memory card, ROM, and the like may be used.

The present invention is not limited to the above embodiments and various changes and modifications can be made within the spirit and scope of the present invention. Therefore, to apprise the public of the scope of the present invention the following claims are made.

What is claimed is:

1. A storage medium storing a control program for controlling an image sensing apparatus comprising a zooming device adapted to perform zooming operation using a zoom lens, a focus adjustment device adapted to correct movement of a focal plane upon movement of said zoom lens by using a focus lens, a driving device adapted to independently move said zoom lens and said focus lens parallel to an optical axis, an image sensing element, a selection device adapted to select a charge storage time of said image sensing element, a shutter speed control device adapted to control a timing of the charge storage time of said image sensing element, and a control device adapted to control a focus speed of said focus adjustment device for compensating a change of the focal plane caused by the zooming operation and maintaining an in-focus state, wherein the control program has a control module for the step of controlling to change the focus speed of said focus adjustment device in accordance with a shutter speed so that the focus adjustment device can correct movement of the focal plane following the movement of said zoom lens during the zooming operation.

2. The storage medium according to claim 1, wherein the control program has a control module for the control step of controlling to decrease the zoom speed of said zooming device when the shutter speed is not more than a predetermined value.

3. An image sensing apparatus having an arrangement which can maintain an in-focus state by correcting a displacement of a focal plane during zooming operation, comprising:

a signal detection device adapted to extract a high-frequency component from a video signal obtained by photographing an object, and detecting a sharpness signal;

a zoom speed detection device adapted to detect a speed of the zooming operation; and an evaluation value calculation device adapted to change a time during which the sharpness signals are averaged in accordance with the speed of the zooming operation, during the zooming operation, and calculating a focus evaluation value during the zooming operation in the set averaging time.

wherein said evaluation value calculation device includes an averaging time table set in correspondence with various zoom speeds, determines the various zoom speeds by referring to the averaging time, and calculates the focus evaluation value.

4. The apparatus according to claim 3, wherein said evaluation value calculation device calculates the focus evaluation value in accordance with the speed of the zooming operation by shortening the averaging time of the sharpness signals when the zoom speed is high, and prolonging the averaging time of the sharpness signals when the zoom speed is low.

5. An image sensing apparatus having an arrangement which can maintain an in-focus state by correcting a displacement of a focal plane during zooming operation, comprising:

a signal detection device adapted to extract a high-frequency component from a video signal obtained by photographing an object, and detecting a sharpness signal;

a signal extraction device adapted to extract a luminance signal from the video signal obtained by photographing the object; and an evaluation value calculation device adapted to change in response to the zooming operation a time during which the sharpness signals are averaged in accordance with an object illuminance obtained from the luminance signal, and calculating a focus evaluation value during the zooming operation in the set averaging time.

6. The apparatus according to claim 5, wherein said evaluation value calculation device calculates the focus evaluation value in accordance with the object illuminance by shortening the averaging time of the sharpness signals when the object illuminance is high, and prolonging the averaging time of the sharpness signals when the object illuminance is low.

7. An image sensing apparatus having an arrangement which can maintain an in-focus state by correcting a displacement of a focal plane during zooming operation, comprising:

a signal detection device adapted to extract a high-frequency component from a video signal obtained by photographing an object, and detecting a sharpness signal;

a shake detection device adapted to detect a shake of said image sensing apparatus; and an evaluation value calculation device adapted to change a time during which the sharpness signals are averaged in accordance with information from said shake detection device, during the zooming operation, and calculating a focus evaluation value during the zooming operation in the set averaging time.

wherein said evaluation value calculation device calculates the focus evaluation value by shortening the averaging time of the sharpness signals when no shake is detected by said shake detection device, and prolonging the averaging time of the sharpness signals when a shake is detected.

8. An image sensing apparatus comprising:
a first lens group for zooming operation;
a second lens group for correcting movement of a focal plane during movement of said first lens group;
a signal detection device adapted to extract a high-frequency component from a video signal obtained by photographing an object, and detecting a sharpness signal;
a zoom speed detection device adapted to detect a speed of the zooming operation;
a storage device adapted to store information of a focus position of said second lens group relative to a position of said first lens group in correspondence with an object distance;
a moving speed calculation device adapted to obtain a standard moving speed of said second lens group upon movement of said first lens group on the basis of the information stored in said storage device;
a speed addition device adapted to add a correction speed to the standard moving speed of said second lens group, obtained by said moving speed calculation device, during the zooming operation; and
a focus control device adapted to change a time during which the sharpness signals are averaged in accordance with the speed of the zooming operation, during the zooming operation, calculating a focus evaluation value during the zooming operation in the set averaging time, and changing the correction speed to be added to the standard moving speed in accordance with a magnitude of the calculated focus evaluation value.
wherein said evaluation value calculation device includes an averaging time table set in correspondence with various zoom speeds, determines the various zoom speeds by referring to the averaging time, and calculates the focus evaluation value.

9. The apparatus according to claim 8, wherein said focus control device calculates the focus evaluation value in accordance with the speed of the zooming operation by shortening the averaging time of the sharpness signals when the zoom speed is high, and prolonging the averaging time of the sharpness signals when the zoom speed is low.

10. An image sensing apparatus comprising:
a first lens group for zooming operation;
a second lens group for correcting movement of a focal plane during movement of said first lens group;
a signal detection device adapted to extract a high-frequency component from a video signal obtained by photographing an object, and detecting a sharpness signal;
a signal extraction device adapted to extract a luminance signal from the video signal obtained by photographing the object;
a storage device adapted to store information of a focus position of said second lens group relative to a position of said first lens group in correspondence with an object distance;
a moving speed calculation device adapted to obtain a standard moving speed of said second lens group upon movement of said first lens group on the basis of the information stored in said storage device;
a speed addition device adapted to add a correction speed to the standard moving speed of said second lens group, obtained by said moving speed calculation device, during the zooming operation; and
a focus control device adapted to change in response to the zooming operation a time during which the sharpness signals are averaged in accordance with an object illuminance obtained from the luminance signal, calculating a focus evaluation value during the zooming operation in the set averaging time, and changing the correction speed to be added to the standard moving speed in accordance with a magnitude of the calculated focus evaluation value.

11. The apparatus according to claim 10, wherein said focus control device calculates the focus evaluation value in accordance with the object illuminance by shortening the averaging time of the sharpness signals when the object illuminance is high, and prolonging the averaging time of the sharpness signals when the object illuminance is low.

12. An image sensing apparatus comprising:
a first lens group for zooming operation;
a second lens group for correcting movement of a focal plane during movement of said first lens group;
a signal detection device adapted to extract a high-frequency component from a video signal obtained by photographing an object, and detecting a sharpness signal;
a shake detection device adapted to detect a shake of said image sensing apparatus;
a storage device adapted to store information of a focus position of said second lens group relative to a position of said first lens group in correspondence with an object distance;
a moving speed calculation device adapted to obtain a standard moving speed of said second lens group upon movement of said first lens group on the basis of the information stored in said storage device;
a speed addition device adapted to add a correction speed to the standard moving speed of said second lens group, obtained by said moving speed calculation device, during the zooming operation; and
a focus control device adapted to change a time during which the sharpness signals are averaged in accordance with information from said shake detection device, during the zooming operation, calculating a focus evaluation value during the zooming operation in the set averaging time, and changing the correction speed to be added to the standard moving speed in accordance with a magnitude of the calculated focus evaluation value.
wherein said evaluation value calculation device includes an averaging time table set in correspondence with various zoom speeds, determines the various zoom speeds by referring to the averaging time, and calculates the focus evaluation value.

13. A lens control method used in an image sensing apparatus including a first lens group for zooming operation and a second lens group for correcting movement of a focal plane during movement of said first lens group and adapted to control movement of said second lens group so as to maintain an in-focus state by correcting a displacement of a focal plane upon movement of said first lens group during zooming operation, comprising the steps of:
creating an averaging sharpness signal generated by extracting a high-frequency component from a video signal obtained by photographing an object, and calculating a focus evaluation value for determining a moving speed of said second lens group on the basis of the averaged sharpness signal; and changing the averaging time of the sharpness signal during the zooming operation in accordance with a speed of the zooming operation.

14. A lens control method used in an image sensing apparatus including a first lens group for zooming operation and a second lens group for correcting movement of a focal plane during movement of said first lens group and adapted to control movement of said second lens group so as to maintain an in-focus state by correcting a displacement of a focal plane upon movement of said first lens group during zooming operation, comprising the steps of:

creating an averaging sharpness signal generated by extracting a high-frequency component from a video signal obtained by photographing an object, and calculating a focus evaluation value for determining a moving speed of said second lens group on the basis of the averaged sharpness signal; and changing the averaging time of the sharpness signal during the zooming operation in accordance with an object illuminance obtained from a luminance signal in the video signal obtained by photographing the object and a zooming speed of the zooming operation.

15. A lens control method used in an image sensing apparatus including a first lens group for zooming operation and a second lens group for correcting movement of a focal plane during movement of said first lens group and adapted to control movement of said second lens group so as to maintain an in-focus state by correcting a displacement of a focal plane upon movement of said first lens group during zooming operation, comprising the steps of:

creating an averaging sharpness signal generated by extracting a high-frequency component from a video signal obtained by photographing an object, and calculating a focus evaluation value for determining a moving speed of said second lens group on the basis of the averaged sharpness signal; and changing the averaging time of the sharpness signal during the zooming operation in accordance with information from a shake detection device adapted to detect a shake of said image sensing apparatus and a zooming speed of the zooming operation.

* * * * *